United States Patent
Tsumura et al.

(10) Patent No.: US 6,715,432 B2
(45) Date of Patent: Apr. 6, 2004

(54) SOLID FUEL BURNER AND METHOD OF COMBUSTION USING SOLID FUEL BURNER

(75) Inventors: Toshikazu Tsumura, Kure (JP); Hirofumi Okazaki, Hitachi (JP); Miki Shimogori, Kure (JP); Kenji Kiyama, Kure (JP); Kouji Kuramashi, Kure (JP); Hitoshi Kikuchi, Kure (JP); Yoshitaka Takahashi, Kure (JP); Shigeki Morita, Kure (JP); Kazuhito Sakai, Kure (JP); Masayuki Taniguchi, Hitachi (JP); Hironobu Kobayashi, Hitachi (JP)

(73) Assignee: Babcock-Hitachi Kabushiki Kaisha, Tokyo (JP)

(*) Notice: Subject to any disclaimer, the term of this patent is extended or adjusted under 35 U.S.C. 154(b) by 0 days.

(21) Appl. No.: 10/101,795

(22) Filed: Mar. 19, 2002

(65) Prior Publication Data

US 2002/0144636 A1 Oct. 10, 2002

Related U.S. Application Data

(63) Continuation of application No. PCT/JP01/06684, filed on Aug. 3, 2001, now abandoned.

(30) Foreign Application Priority Data

Aug. 4, 2000  (JP) ........................................ 2000-237235
Jan. 29, 2001  (JP) ........................................ 2001-020851
May 17, 2001  (JP) ........................................ 2001-147964

(51) Int. Cl.$^7$ ................................................. F23D 1/00
(52) U.S. Cl. .................... 110/261; 110/264; 110/265; 110/347
(58) Field of Search ................................ 110/260, 261, 110/262, 263, 264, 265, 266, 347; 431/181, 185, 188, 10, 8, 9, 187

(56) References Cited

U.S. PATENT DOCUMENTS 5,411,395 A * 5/1995 Kobayashi et al. ......... 431/187
6,123,542 A * 9/2000 Joshi et al. ................. 431/183

FOREIGN PATENT DOCUMENTS

JP          59210205 A     11/1984

(List continued on next page.)

OTHER PUBLICATIONS

Claim of Japanese Utility model Publication (Kokai) 60(1985)—81422.

Primary Examiner—Kenneth Rinehart
(74) Attorney, Agent, or Firm—Intellectual Property Law Group LLP; Otto O. Lee; Juneko Jackson

(57) ABSTRACT

According to a burner of the present invention, a stable combustion is obtained in a wide range from a high-load operation condition to a low-load operation condition even in the case of low quality solid fuel such as brown coal.

The amount of air supplied from additional air holes or additional air nozzles 12 can be adjusted depending on the combustion load of furnace 41. At a low load, the amount of air supplied from additional air holes or additional air nozzles 12 is increased, whereby the oxygen concentration in a recirculation zones 19 formed downstream of the outside of a fuel nozzle 11 exit, permits a stable combustion. At a high load, the amount of air supplied from additional air holes or additional air nozzles 12 is reduced, whereby a flame is formed in a position far from the fuel nozzle 11. This suppresses thermal radiation onto a solid fuel burner 42 structure and a furnace 41 wall. The solid fuel burner 42 is applicable to combustion using low-quality solid fuel such as brown coal and exhaust gas as the carrier gas.

53 Claims, 31 Drawing Sheets

FOREIGN PATENT DOCUMENTS

| | | |
|---|---|---|
| JP | 60176315 A | 9/1985 |
| JP | 62172105 A | 7/1987 |
| JP | 04214102 A | 8/1992 |
| JP | 08270931 A | 10/1996 |
| JP | 10073208 A | 3/1998 |
| JP | 11132414 A | 5/1999 |
| JP | 11148610 A | 6/1999 |

* cited by examiner

FIG. 23
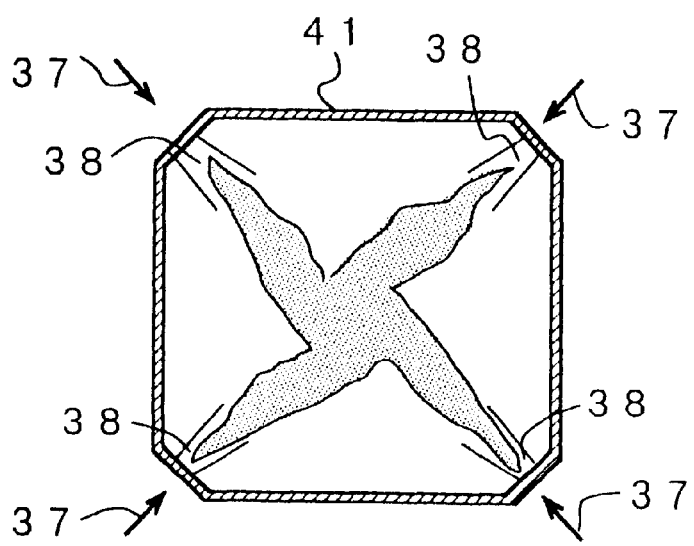
(a)
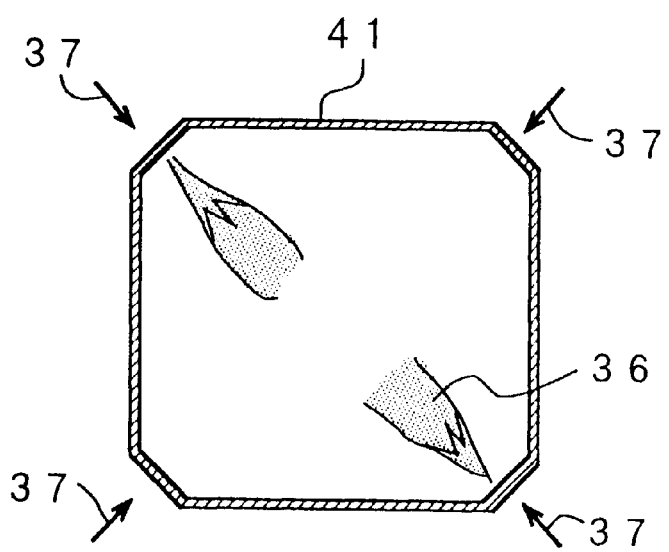
(b)

FIG. 24
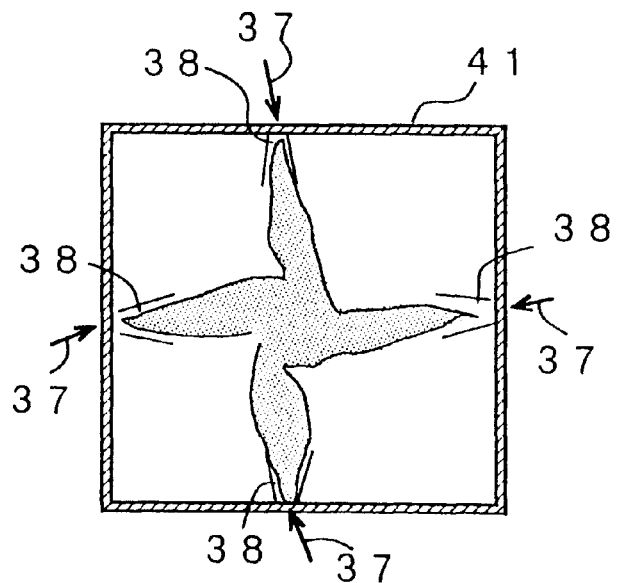
(a)
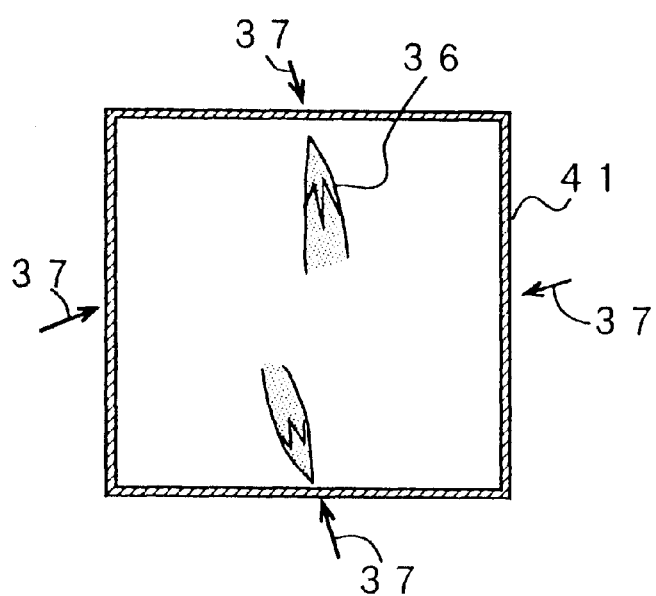
(b)

FIG. 25
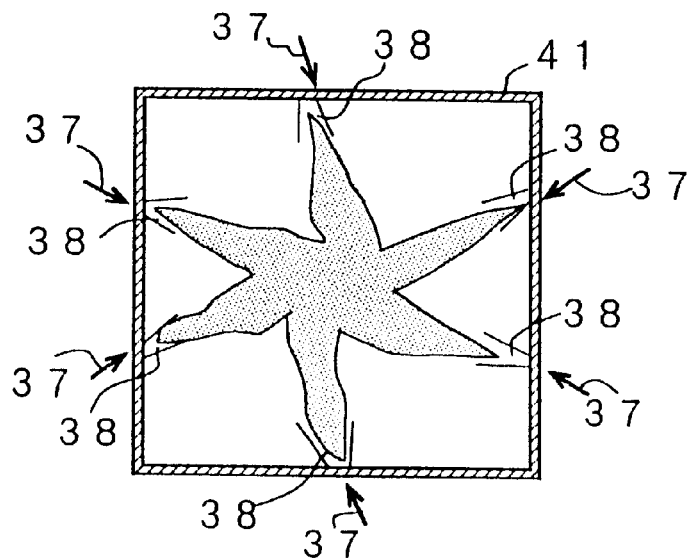
(a)
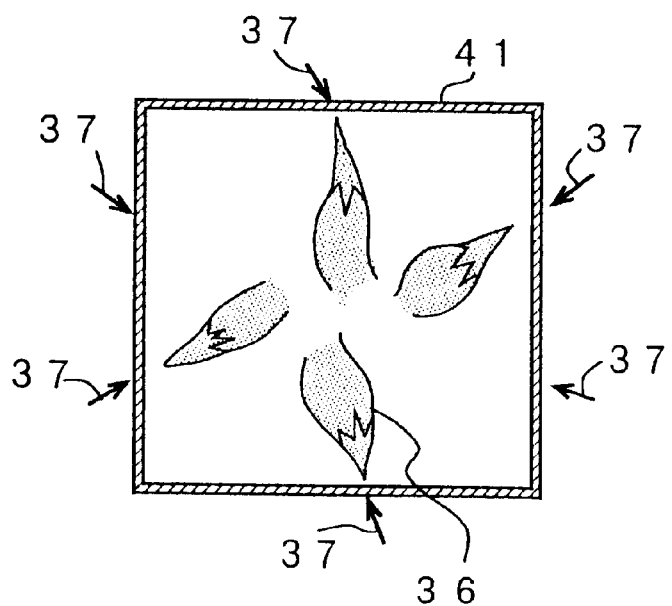
(b)

FIG. 26
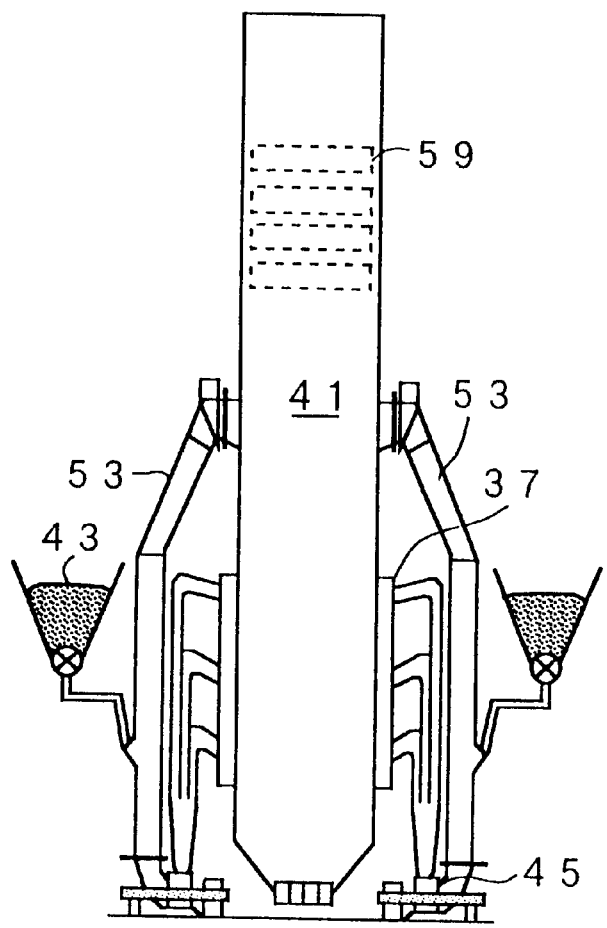
(a)
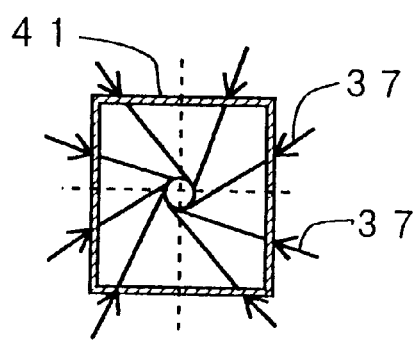
(b)

PRIOR ART
FIG. 31
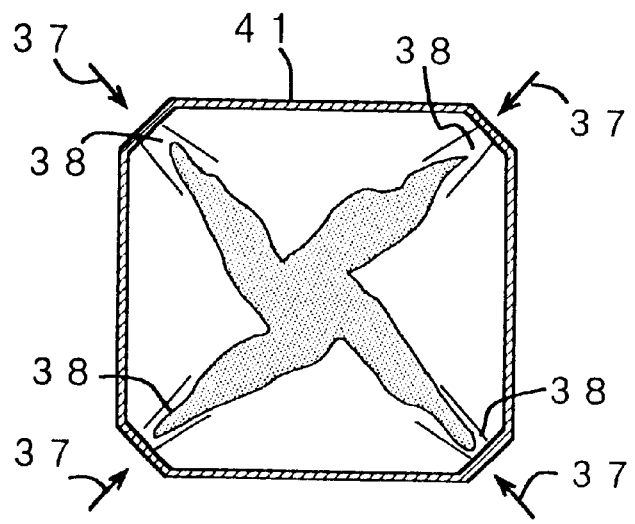
(a)
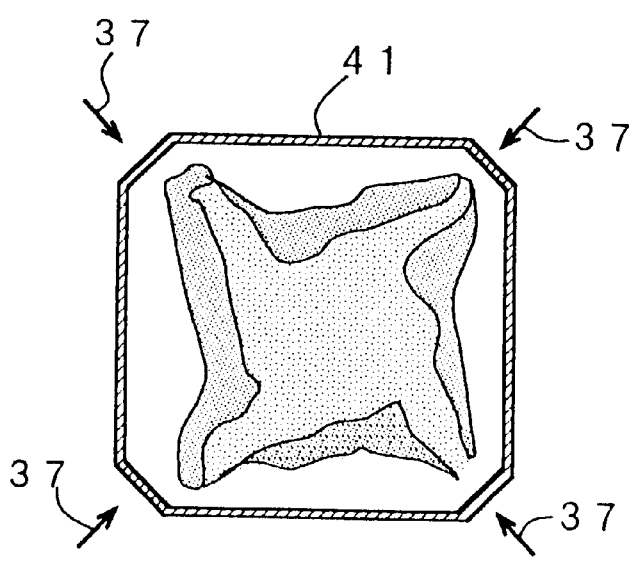
(b)

SOLID FUEL BURNER AND METHOD OF COMBUSTION USING SOLID FUEL BURNER

SPECIFICATION

This is a continuation of International Application PCT/JP01/06684, with an international filing date of Aug. 3, 2001, published in English under PCT Article 21(2) and now abandoned.

TECHNICAL FIELD

The present invention relates to a solid fuel burner and a method of combustion using the same for combusting a solid fuel carried by air flow; and in particular, to: a solid fuel burner and a method of combustion using the same which are applicable in a wide range of furnace loads and hence suitable for combusting a moisture-rich and volatile-matter-rich fuel such as pulverized coal, wood, and peat, and further permitting combustion by reducing the concentration of nitrogen oxides (NOx) in the exhaust gas; a combustion apparatus, such as a furnace, a heating furnace, and a hot blast stove, using said burner, and a method of operation thereof; a coal-fired boiler and a system using the same; and a coal-fired power generation system.

BACKGROUND ART

Pollution control regulations have been tightened in recent years for the purpose of environmental protection. In particular, for the above-mentioned kind of pulverized-coal boilers for combusting coal, reduction in the generation of NOx in the exhaust gas (NOx reduction, hereafter) is seriously required. Two-stage combustion methods are known as combustion techniques (NOx reduction techniques) for reducing the concentration of NOx generated in exhaust gas. The two-stage combustion methods are classified into the following two approaches. One approach is to reduce the NOx generation of a furnace as a whole, while the other approach is to reduce the NOx generation of a single burner. In the approach to reduce the NOx concentration of a furnace as a whole, the air ratio (ratio of the amount of supplied air to the amount of necessary air for completely combusting an amount of fuel; the air ratio of unity corresponds to one stoichiometric equivalent) in the burner zone of the furnace is maintained below unity. In this fuel-rich condition, generated NOx is chemically reduced, and hence NOx reduction is achieved. The unburnt carbon resulting from this approach is completely combusted with air added through an air inlet provided downstream of the burner zone.

In the approach to reduce the NOx generation of a single solid fuel burner (simply a burner, in some cases hereafter) such as a pulverized-coal burner, secondary and tertiary air flows are swirled, thereby delaying the mixing thereof with the flow of pulverized-coal burning with primary air alone. By virtue of this, a large chemical reduction region is formed (such a burner is called a NOx-reduced burner, hereafter). This approach is implemented in a NOx reduction pulverized-coal burner (Japanese Unexamined Patent Publications Nos. Sho-60-176315 and Sho-62-172105).

These techniques have achieved a reduction of NOx concentration in the exhaust gas down to 130 ppm (fuel ratio=fixed carbon/volatile matter=2, nitrogen content in the coal=1.5%, and unburnt carbon content in the ash=5% or less). Nevertheless, the regulated value of NOx concentration in the exhaust gas has been tightened year by year, and the required value of NOx concentration in the exhaust gas for the near future is 100 ppm or less.

NOx-reduced burners capable of reducing NOx generation down to 100 ppm or less have been developed. Such burners include: a burner having an internal flame stabilizing ring for reinforcing the NOx-reduced combustion in the burner section; and a burner having a flame stabilizing ring for bridging between an internal flame stabilizing ring as described above and an external flame stabilizing ring provided in the outer periphery of the combustion nozzle through which the mixture of pulverized coal and carrier gas flows.

By the way, in geological areas where an increase in energy demand is expected, a majority in the near future will use low-quality coal which is rich in moisture and ash matter and has a low calorific value. Among various low-quality coals, high-moisture content coal, such as brown coal and subbituminous coal, is found in abundance. Nevertheless, such coal has a problem of poor fuel performance, such as a lower flame temperature and poor combustibility, in comparison with bituminous coal. Brown coal is found mainly in Eastern Europe, and is a rather young coal containing 20% or more ash matter and 30% or more moisture.

Further, low-coalification coal (such as brown coal and lignite), wood, and peat are rich in volatile matter which is released in gaseous form while being heated, and are also rich in moisture. Such kinds of fuel have a lower calorific value than that of high-coalification coal such as bituminous coal and anthracite, and in addition, are generally poor in pulverizability. Further, the ash of such kinds of fuel has a lower melting point. The richness in volatile matter easily causes spontaneous ignition during storage and pulverization processes in air. This causes difficulty in handling processes in comparison with the case of bituminous coal and the like. In order to avoid this difficulty, when brown coal and lignite are pulverized and combusted, a mixture of exhaust gas and air is used as the fuel carrier gas. Since the mixture gas has a lower oxygen concentration, the spontaneous ignition of fuel is prevented. Further, the residual heat in the exhaust gas helps evaporation of moisture in the fuel carried by the mixture gas.

Nevertheless, since the fuel is carried by the low-oxygen-concentration gas, the combustion reaction does not proceed until the fuel ejected from the burner is mixed with air. That is, the combustion reaction is limited by the rapidity of mixing of the fuel with air. This causes a slower combustion rate than that of bituminous coal which can be carried by air. Accordingly, the time necessary to burn out is longer than that of bituminous coal. This causes an increase in unburnt carbon in the furnace exit.

A method for accelerating the ignition of the fuel carried by the carrier gas of low oxygen concentration is to provide an air ejection nozzle in the tip of the fuel nozzle so as to increase the oxygen concentration of the fuel carrier gas. For example, Japanese Unexamined Patent Publication No. Hei-10-73208 discloses a burner having an air nozzle outside a fuel nozzle. Further, commonly used is a burner having an air nozzle at the center of a fuel nozzle so as to accelerate the mixing of the fuel with air at the exit of the fuel nozzle.

Further, Japanese Unexamined Patent Publication No. Hei-4-214102 discloses a burner comprising: a fuel nozzle for ejecting a mixture of pulverized coal and carrier gas; and a secondary air nozzle and a tertiary nozzle provided outside the fuel nozzle; where in a flame stabilizing ring for maintaining the flame obtained by the pulverized coal ejected from the fuel nozzle is provided at the tip of a septum between the fuel nozzle and the secondary air nozzle.

As described above, brown coal is an inexpensive fuel. Nevertheless, its characteristics of a high ash content, a high moisture content, and a low calorific value cause problems in combustibility and ash cohesion. As for combustibility, the key technology to efficient combustion depends on how to accelerate the ignition and form a stable flame. The ash cohesion to the burner structure and the furnace wall surface is caused by the low melting point of the ash. This is because the brown coal is rich in calcium, sodium, and the like. Further, the ash cohesion is accelerated by the fact that the brown coal needs to be supplied in a larger amount in order to compensate the lower calorific value in comparison with the bituminous coal, thereby generating a larger amount of ash. Such slagging and fouling is a disadvantage of the brown coal. Accordingly, in order to use low-quality coal, such as brown coal and lignite, for burner combustion, both efficient combustion and ash cohesion reduction need to be achieved.

Methods for combusting brown coal generally used abroad are a tangential firing method and a corner firing method. In the former method, a burner compartment composed of fuel passages and combustion air passages is provided in each sidewall of a furnace. In the latter method, a burner compartment composed of fuel passages and combustion air passages is provided in each corner of a furnace.

Described below is the difference in these methods from a so-called opposed firing method in which a group of burners are provided in each of the opposing wall surfaces of a furnace as is generally used in Japan for combusting bituminous coal.

In the opposed firing method, each burner (multiple tubes for fuel and combustion air) is operated by a self flame stabilizing method. In the methods for combusting brown coal, instead of the self flame stabilizing method implemented in the exit of the burner, a jet of combustion air has momentum, and is mixed with fuel around the center of the furnace, thereby causing a stable combustion.

FIG. 30 is a front view of an example of a burner compartment 37 according to the corner firing method or the tangential firing method, viewed from the furnace side. Each airflow has a diverse velocity depending on its diverse purpose. A center air nozzle 124 mixes air into the fuel supplied by an exhaust gas flow from a fuel nozzle 125, thereby increasing oxygen concentration and accelerating the combustion. An outermost air nozzle 126 supplies a highly penetrative jet having a velocity of 50 m/s or higher, thereby stabilizing the fuel combustion around the center of the furnace.

A key technology necessary to establish dominance within the world market in the relatively new field of combustion of low-quality coal such as brown coal is a pulverized-coal burner operable even in load variation depending on the variation in electric power demand. In Eastern Europe, boilers need to operate at a partial load as low as 30% in some cases. In such cases, the prior art has the following problems.

As described above, the important point in the prior art combustion of brown coal (corner firing method and tangential firing method) is to provide a highly penetrative jet of the mixture of fuel and combustion air, so as to stabilize combustion in the furnace. By decreasing the load in furnace, the above-mentioned momentum of the jet from the burner compartment 37 also decreases, thereby causing instability in the flame. FIG. 31 is a cross sectional plan view of a furnace 41 according to a corner firing method, showing an example of the variation of flame shape when the load of the furnace 41 decreases from a high-load state to a low-load state. At a high load as shown in FIG. 31($a$), the jet from the burner compartment 37 forms a blow-off section 38 near the exit of the burner, and further forms a stable combustion region between the vicinity of the exit and the center of the furnace 41, thereby achieving efficient combustion.

In contrast, at a low load, the flow velocity and hence the momentum of each jet from the burner compartment 37 decreases. Accordingly, a stable combustion region as shown in FIG. 31($a$) is not formed, and hence the combustion is unstable (the whole region of the furnace 41 becomes dark as shown in FIG. 31($b$)). For the purpose of prevention of the flame extinction of the burner at a low load, a flame detector 48 for monitoring the formation of a stable combustion region in the furnace 41 is provided near an after-air port 49 in the upper part of the furnace 41 as shown in the cross sectional views of FIGS. 32. This flame detector 48 determines that flame extinction has occurred when the brightness of the furnace 41 decreases as shown in FIG. 31($b$).

As such, since the formation of a stable combustion region in the furnace 41 is affected by the momentum of the jet of each burner, the prior art method is not applicable at a low load. Here, in FIGS. 31($a$) and 31($b$), burner compartments 37 are provided in the lower part of the furnace 41, whereby the jets of the mixture of fuel and carrier gas from the burner compartments 37 are mixed with combustion air supplied from the after-air ports 49, thereby forming a flame.

Further, in the high-load operation of a prior art combustion apparatus (furnace), that is, when a large amount of fuel is supplied to the burners, heat radiation from the flame heats up the burner structure to a higher temperature. Since the ash of low-coalification coal such as brown coal and lignite has a lower melting point, the ash lying on the heated-up section of the burner structure melts down, and the fused ash grows gradually. The grown fused ash can disturb the combustion of the fuel. Accordingly, in the high-load operation, the flame needs to be formed in a position far from the burner.

An object of the invention is to provide: a solid fuel burner and a method of combustion using the same which can perform stable combustion in a wide range of furnace loads from a high-load operation condition to a low-load operation condition and hence are suitable for combusting low-coalification fuel such as brown coal and lignite; a combustion apparatus using said burner, and a method of operation thereof; and a coal-fired boiler using said burner.

Another object of the invention is to provide: a burner suitable for the opposed firing method and capable of efficiently combusting pulverized coal, such as brown coal having poor ash characteristics, near the exit of the burner and thereby preventing ash cohesion in the vicinity of the burner; and a combustion apparatus using the same.

Another object of the invention is to provide: a burner suitable for the corner firing and the tangential firing method and capable of forming a stable combustion region around the center of a furnace even at a low combustion load of the furnace by preventing ash cohesion onto the furnace side walls; and a combustion apparatus using the same.

Another object of the invention is to provide: a multi-tube burner suitable for the opposed firing method and corner firing and the tangential firing method; and a combustion apparatus using the same.

Further, the NOx-reduced burner according to the prior art has a configuration suitable for reducing the NOx concentration in the exhaust gas in the combustion of ordinary bituminous coal. Nevertheless, in a combustion apparatus using highly ignitable fuel such as brown coal and peat, the carrier gas used is not primary air but the exhaust gas of low oxygen concentration for the purpose of preventing spontaneous ignition. In this case, ignition near the burner is difficult and causes the following two problems.

(1) Because of difficulty in flame piloting near the burner, operation without assisted combustion by oil or fuel gas is limited to a high load condition in which the combustion temperature in the combustion furnace is sufficiently high.

(2) NOx reduction is not achieved, because the combustion rate is low in the near-the-burner region where the fuel is in excess over the combustion air, that is, because the combustion rate is high after mixing with secondary and tertiary air.

The above-mentioned problems result from use of a low-oxygen concentration gas as the coal carrier gas. In order to resolve the problems, it may be possible to supply combustion air into the fuel nozzle near the exit of the burner so as to increase the oxygen concentration. Nevertheless, this configuration reduces the concentration of the pulverized coal, and hence does not improve the ignition performance.

Thus, an object of the invention is to provide a solid fuel burner capable of rapidly and efficiently combusting pulverized coal, such as brown coal having poor ash characteristics, near the exit of the burner and thereby achieving NOx-reduced combustion; and a combustion apparatus using the same.

DISCLOSURE OF INVENTION

A burner according to the invention is suitable for the use of a mixture fluid consisting of: a solid fuel composed of low-coalification coal such as brown coal and lignite; and a carrier gas having an oxygen concentration less than 21%.

(1) A first burner according to the invention is a solid fuel burner comprising: a center air nozzle for ejecting air; a fuel nozzle provided outside the center air nozzle and ejecting a mixture fluid consisting of a solid fuel and a carrier gas; additional air holes or additional air nozzles provided in the inner wall surface of the fuel nozzle and ejecting air; and one or more outer air nozzles provided outside the fuel nozzle and ejecting combustion air.

In the above-mentioned burner, it is possible to increase the amount of air ejected from the additional air holes or additional air nozzles for ejecting air along the inner side of wall of the fuel nozzle. The air ejected from the additional air holes or additional air nozzles increases the oxygen concentration near inner side of wall of the fuel nozzle. This accelerates the combustion in comparison with the case of a lower oxygen concentration. Accordingly, ignition of the fuel quickens, and hence a flame is formed starting from the vicinity of the fuel nozzle.

In an above-mentioned burner further comprising a swirler within the center air nozzle, the method of ejecting air from the center air nozzle can be selected, in response to the combustion load, from the two methods of: (1) a straightforward jet or weakly swirled jet; and (2) a strongly swirled jet.

In this case, (a) the exit of the center air nozzle and/or (b) the exit of the additional air holes or additional air nozzles are preferably located upstream of the exit of the fuel nozzle inside the burner. According to this configuration, mixing of the fuel with the air ejected from (a) the center air nozzle and/or (b) the additional air holes or additional air nozzles is achieved within the fuel nozzle. This permits a partial increase in oxygen concentration of the fuel carrier gas.

Both the distance between the exit of the fuel nozzle and the exit of the center air nozzle and the distance between the exit of the fuel nozzle and the exit of the additional air holes or additional air nozzles are set preferably so that the residence time of the fuel in the fuel nozzle does not exceed the ignition delay time (approximately 0.1 s) of the fuel. The purpose of this is to prevent a back fire and burn damage caused by the flame formation within the fuel nozzle. Since the fuel carrier gas generally flows through the fuel nozzle at a velocity of 10–20 m/s, the above-mentioned distances are 1–2 m or less.

When a passage contracting member for temporarily contracting the cross section of the fuel nozzle gradually starting from the upstream of the burner and for recovering the cross section is provided in the inner side of wall of the fuel nozzle of the burner, the flow of fuel particles (of pulverized coal) having a larger inertia than that of the fuel carrier gas (exhaust gas and the like) is focused to the center axis region. Further, when a condenser consisting of both a conical section having a gradually increasing cross section starting from the upstream of the burner and a subsequent conical section having a gradually decreasing cross section is provided on the outer side of wall of the center air nozzle so as to be located downstream of the passage contracting member, the flow of fuel particles (of pulverized coal) having been focused at the center axis region is expanded by the condenser and then flows through the passage of the fuel nozzle after passing through the condenser. At that time, the flow of fuel particles (of pulverized coal) having a larger inertia than that of the fuel carrier gas (exhaust gas) is concentrated in the inner side region of wall of the fuel nozzle, and flows directed towards the exit. This concentrated flow of pulverized coal in the inner-wall side region of the fuel nozzle easily contacts with outer air (combustion air) near the exit of the fuel nozzle, and further contacts with the high-temperature gas of a recirculation zones generated downstream of the flame stabilizing ring described later, thereby being ignited easily.

When the above-mentioned burner according to the invention is operated at a high load, the fuel ejected from the fuel nozzle is heated up by a strong thermal radiation from the furnace. This situation permits stable combustion even when the fuel is ejected from the fuel nozzle at a high velocity. At that time, air is ejected as a straightforward jet or weakly swirled jet (at a swirl number of 0.3 or lower) from the center air nozzle, whereby the flame is blown off from the vicinity of the burner so that the flame is formed in a position far from the burner. This prevents high temperatures from heating up the burner structure by thermal radiation of the flame.

In contrast, when the above-mentioned burner according to the invention is operated at a low load, air is ejected as a strongly swirled jet (at a swirl number of 0.5 or higher) from the center air nozzle, whereby the mixing of the fuel jet with air is accelerated. Further, since the ejection velocity of the fuel at the burner center axis is reduced by the swirled air jet from the center air nozzle, the residence time of the fuel near the fuel nozzle becomes longer. Accordingly, the fuel is heated up near the fuel nozzle at a temperature necessary for combustion, whereby a flame is formed starting from the vicinity of the fuel nozzle.

In the above-mentioned burner according to the invention, the ratio between the amount of air ejected from the center air nozzle and the amount of air ejected from the additional air holes or additional air nozzles is adjustable depending on the combustion load. For example, at a low combustion load, the amount of air ejected from the center air nozzle is reduced, whereas the amount of air ejected from the additional air holes or additional air nozzles is increased. In contrast, at a high combustion load, the amount of air ejected from the center air nozzle is increased, whereas the amount of air ejected from the additional air holes or additional air nozzles is reduced.

In the above-mentioned burner according to the invention, the amount of air is adjusted during combustion preferably so that the air ratio to volatile matter (the ratio of the total amount of air supplied from the fuel nozzle, the center air nozzle, and the additional air holes or additional air nozzles, to the amount of air necessary for the complete combustion of the volatile matter contained in the fuel) is 0.85–0.95.

Further, an obstacle (flame stabilizing ring) against both the gas flow from the fuel nozzle and the air flow from the outer air nozzle is preferably provided at the tip of a septum between the fuel nozzle and the outer air nozzle.

The pressure downstream of the flame stabilizing ring decreases, whereby a recirculation zones directing from the downstream to the upstream is formed. Within the recirculation zones, burnt gas of high temperature generated in the downstream resides in addition to the fuel and air ejected from the outer nozzles. Accordingly, the recirculation zones is at a high temperature, thereby serving as an ignition source for the fuel jet flowing in the vicinity. This permits the stable formation of a flame starting from the exit of the fuel nozzle.

Further, a flame stabilizing ring having a shark-tooth shaped protrusion may be provided on the inner wall surface of the exit of the fuel nozzle. Such a flame stabilizing ring similarly accelerates the ignition of the fuel.

In the above-mentioned burner according to the invention, the cross section of the downstream passage of the center air nozzle may be smaller than the cross section of the upstream passage of the center air nozzle, and then the position of the swirler provided within the center air nozzle may be movable in the burner center axis direction within the center air nozzle. According to this configuration, the adjustment of the position of the swirler permits the adjustment of the intensity of the air flow swirl depending on the combustion load.

At a low load, the swirler is moved to the downstream having a smaller cross section in the center air nozzle, whereby the air jet from the center air nozzle is strongly swirled, thereby forming a flame near the burner. In contrast, at a high load, the swirler is moved to the upstream having a larger cross section in the center air nozzle, whereby the air jet from the center air nozzle is weakly swirled, thereby forming a flame in a position far from the burner within the furnace.

When the temperature of the burner or the furnace wall surface rises too high, burnt ash coheres onto the burner structure and furnace wall, and the cohesion grows gradually. This phenomenon called slagging tends to occur. In order to suppress the slagging, in response to a signal from a thermometer or a radiation intensity meter provided in the burner or the furnace wall surface, the amount or the swirl intensity of air ejected from the center air nozzle may be adjusted, or alternatively, the amount of air ejected from the additional air holes or additional air nozzles may be adjusted. The adjustment of the amount or the swirl intensity of air causes a change in the position of flame formation within the furnace, thereby permitting the adjustment of the intensity of thermal radiation to the burner and the furnace wall surface.

At a high load, because of a high thermal load of the furnace, the flame is preferably formed in a position far from the burner. At a low load, because of a lower thermal load of the furnace, the temperature of the burner and the furnace wall surface does not rise as high in comparison with the case of the high load even when the flame is formed near the burner.

When the above-mentioned burner according to the invention is used in such a combustion apparatus, the center air nozzle has a cylindrical shape. A pair of air tubes for supplying air are connected to a part upstream of the center air nozzle. Each of the air tubes is connected so as to introduce air from a tangential direction at a mutually opposing position of the circular cross section of the center air nozzle. When the combustion apparatus is operated at a high combustion load (for example, 60–70% or higher), each air tube supplies an identical amount of air into the center air nozzle. In contrast, when the combustion apparatus is operated at a low combustion load (for example, 60–70% or lower), each air tube supplies a diverse amount of air into the center air nozzle. By virtue of such operation, the swirl intensity of the center air jet is adjusted depending on the load.

(2) A second burner according to the invention is a solid fuel burner comprising: a fuel nozzle for ejecting a mixture fluid consisting of a solid fuel and a carrier gas; additional air holes or additional air nozzles provided inside the wall surface of the fuel nozzle and ejecting air; and one or more outer air nozzles provided outside the wall surface of the fuel nozzle and ejecting air. In contrast to the first burner, the second burner does not comprise a center air nozzle for ejecting air.

In the second burner according to the invention, it is possible to increase the amount of air ejected from the additional air holes or additional air nozzles for ejecting air along the inner wall surface of the fuel nozzle. The air ejected from the additional air holes or additional air nozzles increases the oxygen concentration near the inner wall surface of the fuel nozzle. This accelerates the combustion reaction of the fuel in comparison with the case of a lower oxygen concentration. Accordingly, ignition of the fuel quickens, and hence a flame is formed starting from the vicinity of the fuel nozzle.

In the above-mentioned burner, the exit (tip) of the additional air holes or additional air nozzles is preferably located upstream of the exit (tip) of the fuel nozzle within the burner. According to this configuration, mixing of the fuel with the air ejected from the additional air holes or additional air nozzles is achieved within the fuel nozzle. This permits a partial increase in oxygen concentration of the fuel carrier gas. The distance between the exit of the fuel nozzle and the exit of the additional air holes or additional air nozzles is set preferably so that the residence time of the fuel in the fuel nozzle does not exceed the ignition delay time (approximately 0.1 s) of the fuel. The purpose of this is to prevent a back fire and burn damage caused by the flame formation within the fuel nozzle. Since the fuel carrier gas generally flows through the fuel nozzle at a velocity of 10–20 m/s, the above-mentioned distance is 1–2 m or less.

A passage contracting member for temporarily contracting the cross section of the fuel nozzle gradually starting from the upstream of the burner to the downstream direction and for recovering the cross section is preferably provided inside of the wall surface of the fuel nozzle of the burner. This contraction of the passage cross section accelerates of the fuel nozzle the velocity of the fuel carrier gas flowing through the fuel nozzle. Accordingly, even when a flame is formed within the fuel nozzle due to a temporary slow down of fuel flow, a back fire is prevented from proceeding upstream of the contracted passage part formed by the passage contracting member. Further, when a condenser consisting of both a section having a gradually increasing cross section starting from the upstream of the burner to the downstream direction and a subsequent section having a gradually decreasing cross section is provided inside the fuel nozzle so as to be located downstream of the passage contracting member, the flow of fuel particles (of pulverized coal) having been focused at the center axis region is expanded by the condenser and then flows through the passage of the fuel nozzle. At that time, the flow of fuel particles (of pulverized coal) having a larger inertia than that of the fuel carrier gas is concentrated in the inner side of wall of the fuel nozzle, and flows directed towards the exit. This concentrated flow of pulverized coal in the inner side of wall of the fuel nozzle easily contacts with the outer air ejected from the outer air nozzle, in the vicinity of the exit of the fuel nozzle. The flow of pulverized coal further contacts with the high-temperature gas of a recirculation zones generated downstream of a flame stabilizing ring described later, thereby being ignited easily.

Further, a flame stabilizing ring opposing both the flow of the solid fuel mixture from the fuel nozzle and the flow of air is preferably provided at the tip of a wall surface between the fuel nozzle and the outer air nozzle.

The pressure in the furnace downstream of the flame stabilizing ring decreases, whereby a recirculation zones of the mixture fluid directing from the downstream to the upstream is formed. Within the recirculation zones, burnt gas of a high temperature generated in the region downstream of the burner in the furnace resides in addition to air, the fuel and fuel carrier gas ejected from the fuel nozzle and the outer air nozzle. Accordingly, the recirculation zones is at a high temperature, thereby serving as an ignition source for the fuel jet. This permits stable formation of a flame starting from the exit of the fuel nozzle.

A flame stabilizing ring having shark-tooth shaped protrusions may be provided inside the wall surface of the tip (exit) of the fuel nozzle. Such a flame stabilizing ring similarly accelerates the ignition of the fuel.

When exhaust gas is used as the solid fuel carrier gas, exit of additional air holes or additional air nozzles is provided between the conical section having a decreasing cross section in the condenser and the flame stabilizing ring. This configuration permits the mixture gas to have amounts of oxygen necessary for combustion. This mixture gas collides with the flame stabilizing ring, thereby permitting efficient ignition by the flame stabilizing ring. Further, even at a low combustion load and even when the furnace combusts pulverized coal such as brown coal having poor ash characteristics, rapid and effective combustion is achieved near the exit of the burner, thereby permitting NOx-reduced combustion and preventing ash cohesion in the furnace wall surface near the burner.

In the above-mentioned burner according to the invention, the amount of air ejected from the additional air holes or additional air nozzles can be adjusted depending on the combustion load of the combustion apparatus (furnace).

Generally in solid fuel burners not restricted to the above-mentioned solid fuel burner according to the invention, at a high combustion load of the combustion apparatus (furnace), the flame of the solid fuel is preferably formed in a position far from the solid fuel burner within the furnace. In contrast, at a low combustion load of the combustion apparatus (furnace), the flame of the solid fuel is preferably formed starting from the vicinity of the furnace wall surface immediately downstream of the exit of the fuel nozzle for solid fuel.

For example, when additional air holes or additional air nozzles are provided in a solid fuel burner, at a low combustion load of the combustion apparatus (furnace), it is possible to increase the amount of air ejected from the additional air holes or additional air nozzles. The air ejected from the additional air holes or additional air nozzles increases the oxygen concentration near the inner wall surface of the fuel nozzle. This accelerates the combustion reaction of the fuel in comparison with the case of a lower oxygen concentration. Accordingly, ignition of the fuel quickens, and hence a flame is formed starting from the vicinity of the exit (tip) of the fuel nozzle. At a high combustion load of the combustion apparatus (furnace), the amount of air ejected is decreased from the additional air holes or additional air nozzles. This operation decreases the oxygen concentration near the inner side of wall of the fuel nozzle, thereby decelerating the combustion reaction of the fuel in comparison with the case of a lower oxygen concentration. Accordingly, ignition of the fuel becomes slow, and hence a flame is formed in a position far from the burner within the furnace.

At a high combustion load of the combustion apparatus (furnace), the temperature of the solid fuel burner and the furnace wall surface rises. Accordingly, burnt ash coheres onto the burner structure, and the cohesion grows gradually. This phenomenon called slagging tends to occur. In order to suppress the slagging onto the burner structure and the furnace wall surface, at a high combustion load of the combustion apparatus (furnace), the flame is moved to a position far from the burner, thereby comparatively reducing the temperature of the burner and the furnace wall surface. At a low combustion load, the amount of air is adjusted preferably so that the air ratio to volatile matter (the ratio of the total amount of air supplied from the fuel nozzle and the additional air holes or additional air nozzles (if any), to the amount of air necessary for the complete combustion of the volatile matter contained in the fuel) is at 0.85–0.95. Stable combustion is generally difficult to achieve at a low combustion load. However, the air ratio to volatile matter at 0.85–0.95 raises the flame temperature, thereby permitting the continuation of stable combustion.

Further, in order to suppress the slagging onto the burner structure and the furnace wall surface, in response to a signal from a thermometer or a radiation intensity meter provided in the burner or the peripheral furnace wall surface, the amount of air ejected from the additional air holes or additional air nozzles may be adjusted. The adjustment in the amount of air causes a change in the position of flame formation within the furnace, thereby permitting the adjustment of the intensity of thermal radiation to the burner and the furnace wall surface.

As described above, at a high load of the combustion apparatus, because of a higher thermal load of the furnace, the flame is preferably formed in a position far from the burner within the furnace. In contrast, at a low load of the combustion apparatus, because of a lower thermal load of the furnace, the temperature of the burner and the peripheral furnace wall surface does not rise as high in comparison with the case of high load. Accordingly, the flame may be formed near the burner within the furnace.

In the method of combustion using the first burner or the second burner, at a high load of the combustion apparatus, the fuel is ignited in a position far from the burner, and hence the flame is formed in the center of the furnace. In order to monitor the flame generated by the burners at a high load, the flame is monitored preferably at the center of the furnace where the flame at the burners merges. In contrast, at a low load of the combustion apparatus, the fuel is ignited near the burner, and the flame is formed near each burner. Further, in some cases, an independent flame is formed by each burner within the furnace. Accordingly, the flame formed in the exit of each burner is preferably monitored at a low load.

In the first burner and the second burner according to the invention, additional air holes may be used in place of additional air nozzles. The additional air holes are provided in the wall surface of the fuel nozzle, and have the shape of a circle, ellipse, rectangle, or square. Four, eight, or twenty or so, at maximum, of additional air holes may be provided in equal spacing in the radial direction of the fuel nozzle. A single additional air hole formed by a slit in the radial direction of the fuel nozzle disadvantageously causes a non-uniform flow of the additional air ejected from the slit, within the fuel nozzle.

Preferably, heated air is supplied to the additional air holes or additional air nozzles. The heat source for this purpose maybe the pressurized air supplied to the fan mill for pulverized coal generation, or alternatively, the air provided to the air box heated for combustion in the burner. The pressurized air supplied to the fan mill is more preferable because of its rather high pressure.

The air supplying section for the additional air holes or additional air nozzles may be connected to an air box for supplying combustion air (outer air such as secondary and tertiary air) to the outer air nozzle. However, it is more preferable that the air supplying section is connected to a dedicated combustion-air supplying apparatus for supplying combustion air.

When the air supplying section for the additional air holes or additional air nozzles is connected to the dedicated combustion-air supplying apparatus, oxygen-enriched air having an enriched oxygen concentration or pure oxygen can be easily supplied depending on the combustibility of the solid fuel such as pulverized coal and in response to a reduction in the load of the combustion apparatus. Further, a combustion air flow rate regulating apparatus provided for a dedicated combustion-air supplying apparatus permits easy control of the supply rate.

Further, when combustion gas (air) effective for the ignition of the fuel is supplied to the burner by a dedicated combustion-air supplying apparatus, the pressure of the combustion gas (air) can be different from that obtained by the air box. This permits unrestricted selection of the aperture size of the supply of the combustion gas for ignition. Furthermore, a combustion air flow rate regulating apparatus provided for the dedicated combustion-air supplying apparatus permits easy control of the supply rate.

A guide for defining the direction of outer air ejection is provided in the exit of the outer air nozzle of the above-mentioned first burner and second burner according to the invention, whereby the flow of outer air (secondary and tertiary air, in some cases hereafter) is provided with a certain divergence so as to form a divergent flame. At that time, the inclination of the guide is set to be 45 degrees or less relative to the burner center axis, whereby a momentum is provided to the combustion air jet ejected from the outer air nozzle so as to involve the mixture fluid of exhaust gas and pulverized coal. The flame is narrowed by the air jet having a larger momentum, whereby a stable flame (combustion region) is formed in the furnace, thereby permitting efficient combustion of the pulverized coal.

When the guide for guiding the outermost air jet from the outermost air nozzle is provided at such an angle that the outermost air jet moves along the burner and the outside furnace wall surface, the outermost air jet cools down the burner and the outside furnace wall surface, thereby preventing slagging.

Combustion apparatuses equipped with a plurality of above-mentioned first burner and second burner according to the invention in the furnace wall surface include a coal-fired boiler, a peat-fired boiler, and a biomass-fired (wood-fired) boiler and a heating furnace and a hot blast stove.

Thermometers or radiation intensity meters are provided in the above-mentioned first burner and second burner according to the invention or the furnace wall outside the burner. In response to a signal from such an instrument, the amount and the swirl intensity of air ejected from the center air nozzle of the burner are adjusted, and/or the amount of air ejected from the additional air holes or additional air nozzles is adjusted. By virtue of this operation, the position of flame formation in the furnace is appropriately controlled depending on the load change.

An example of the appropriate position measurement of the flame formation is as follows. At a low combustion load of the combustion apparatus, the tip of in-furnace flame of the solid fuel is formed near the furnace wall outside the exit of the fuel nozzle. At a high combustion load of the combustion apparatus, the flame is formed starting from a position far from the exit of the fuel nozzle by 0.5 m or more on the center axis of the fuel nozzle.

At a high load of the combustion apparatus, the flame is monitored around the center of the furnace where the flame at the burners according to the invention merges, by using a flame detector or by visual inspection. In contrast, at a low load of the combustion apparatus, the flame generated at the exit of each burner according to the invention is monitored.

The invention includes a coal-fired boiler system and a coal-fired power generation system described below.

(a) A coal-fired boiler system comprising: a coal-fired boiler; a flue for serving as a passage for the exhaust gas from the boiler; an exhaust-gas cleaning apparatus provided in the flue; a pulverized-coal carrying apparatus for carrying the coal in the form of pulverized coal to the burner according to the invention provided in the boiler; a pulverized-coal supply adjusting apparatus for adjusting the amount of pulverized coal supplied from the pulverized-coal carrying apparatus to the burner; and an air supply adjusting apparatus for adjusting the amount of air ejected from the burner.

(b) In a coal-fired power generation system comprising: a furnace having a furnace wall equipped with a plurality of burners according to the invention; a boiler for boiling the water to generate steam by using the combustion heat obtained by combustion of solid fuel by the burners; a steam turbine driven by the steam obtained by the boiler; and a power generator driven by the steam turbine; a coal-fired power generation system using solid fuel burners according to the invention as said burners.

In the first and the second burner according to the invention, a burner according to the corner firing method or tangential firing method which has been difficult to operate at a low load of a furnace in the prior art is operated in a scheme such that a stable flame combustion region is formed around the center of the furnace at a high load, and is operated in a self flame stabilizing scheme at a low load.

At that time, a unit is formed by solid fuel burners according to the invention, and a plurality of units are arranged at the corners or in opposing sidewalls of the furnace so as to form a pair or pairs of units.

This method of combustion is applicable to a wide range of furnace loads (specifically 30–100%) corresponding to the power demand variation even in a furnace for combusting low-quality coal such as brown coal and lignite.

Specifically, at a high load, a blow-off section is formed at the bottom of the fuel jet from the burner. At a low load, a self flame stabilizing scheme is used, that is, combustion is carried out starting from the bottom of the fuel jet from the burner. The blow-off or the ignition at the bottom of the fuel jet from the burner is controlled by adjustment of the distribution ratio of the combustion air (outer air and outer most air) of the burner and/or by the adjustment of the swirl intensity of the combustion air by using a swirler provided in the outer air nozzle of the burner.

When the burner according to the invention is applied to a boiler furnace, the boiler can be operated depending on the power demand. This prevents the over-generation of steam for the electric power in the boiler furnace, thereby permitting efficient operation of the boiler furnace and substantially reducing the running cost of the boiler furnace.

BRIEF DESCRIPTION OF DRAWINGS

FIG. 23 is a cross sectional plan view of a furnace according to an embodiment of the invention, showing the situation of flame formation by the burner configuration of the corner firing method (FIG. 23($a$) at a high load, and FIG. 23($b$) at a low load).

FIG. 24 is a cross sectional plan view of a furnace according to an embodiment of the invention, showing the situation of flame formation by the burner configuration of the tangential firing method (FIG. 24($a$) at a high load, and FIG. 24($b$) at a low load).

FIG. 25 is a cross sectional plan view of a furnace according to an embodiment of the invention, showing the situation of flame formation by the burner configuration of the tangential firing method (FIG. 25($a$) at a high load, and FIG. 25($b$) at a low load).

FIG. 26 is a configuration diagram of an ordinary brown-coal-fired boiler (FIG. 26($a$) shows an elevation view, and FIG. 26($b$) shows a cross sectional plan view of the furnace).

FIG. 31 is a cross sectional plan view of a prior art furnace, showing the change of the combustion region in the furnace during a reduction in load with the burner configuration of the corner firing method (FIG. 31($a$) at a high load, and FIG. 31($b$) at a low load).

BEST MODE FOR CARRYING OUT THE INVENTION

Figure 1:
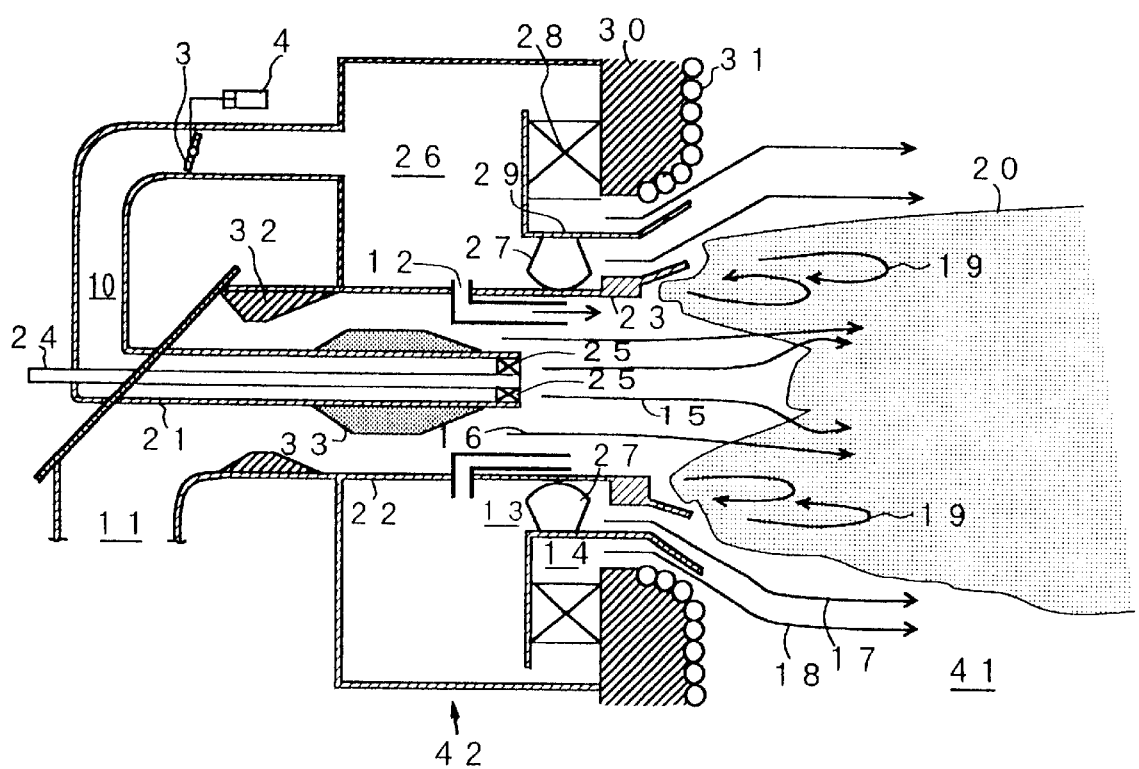
FIG. 1 is a cross sectional view of a pulverized-coal burner according to a first embodiment of the invention, at a low load.

The embodiments of the present invention are described below with reference to the drawings.

FIG. 26 shows a configuration of an ordinary brown-coal-fired boiler furnace 41. FIG. 26($a$) is an elevation view of a brown-coal-fired boiler furnace 41 according to the tangential firing method. FIG. 26($b$) is a cross sectional plan view of the furnace 41 shown in FIG. 26($a$).

In an ordinary brown-coal-fired boiler, exhaust gas (approximately 1,000° C.) is extracted from the upper part of the furnace 41 through an exhaust gas duct 55 (FIG. ). A fan mill 45 dries and pulverizes the brown coal supplied from a coal bunker 43. Heat transmission pipes 59 of a superheater 50 (FIG. 28, FIG. 29) and the like are arranged in the inner upper part of the furnace 41. In a burner according to the corner firing method and tangential firing method, a fan mill 45 is provided in each burner compartment 37 (FIGS. 30).

(First Embodiment)

Figure 2:
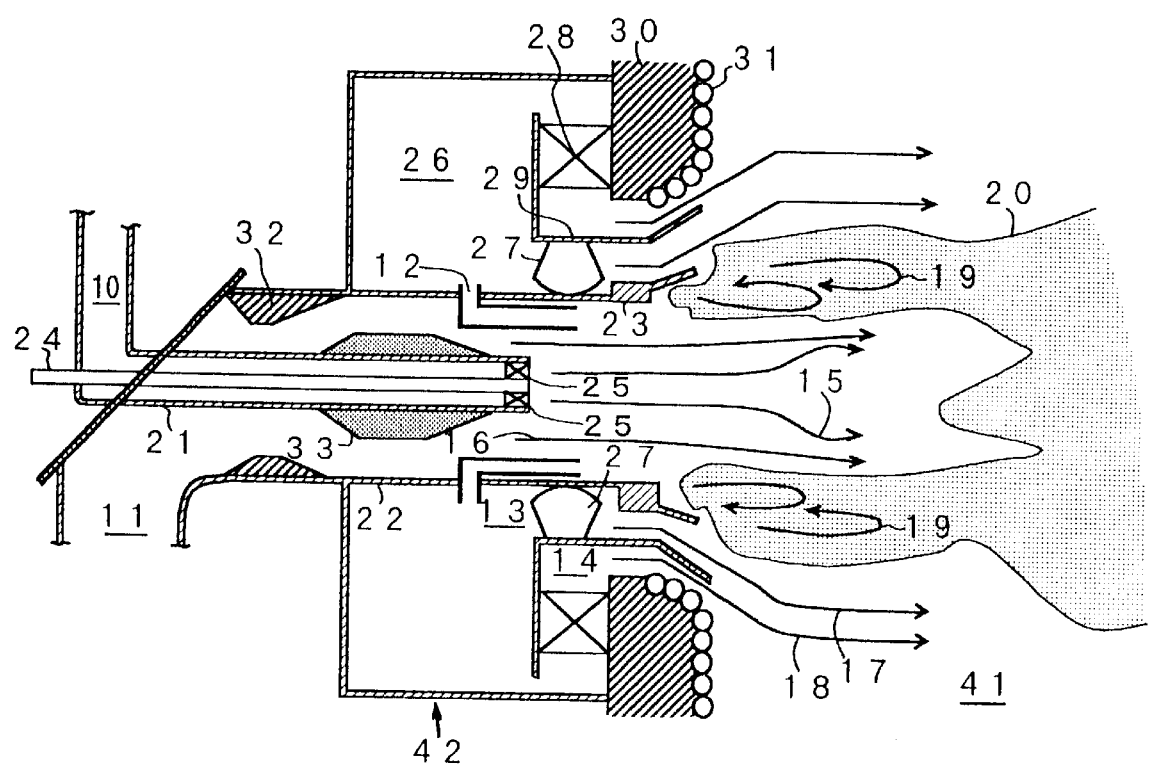
FIG. 2 is a cross sectional view of the pulverized-coal burner of FIG. 1 at a high load.
Figure 3:
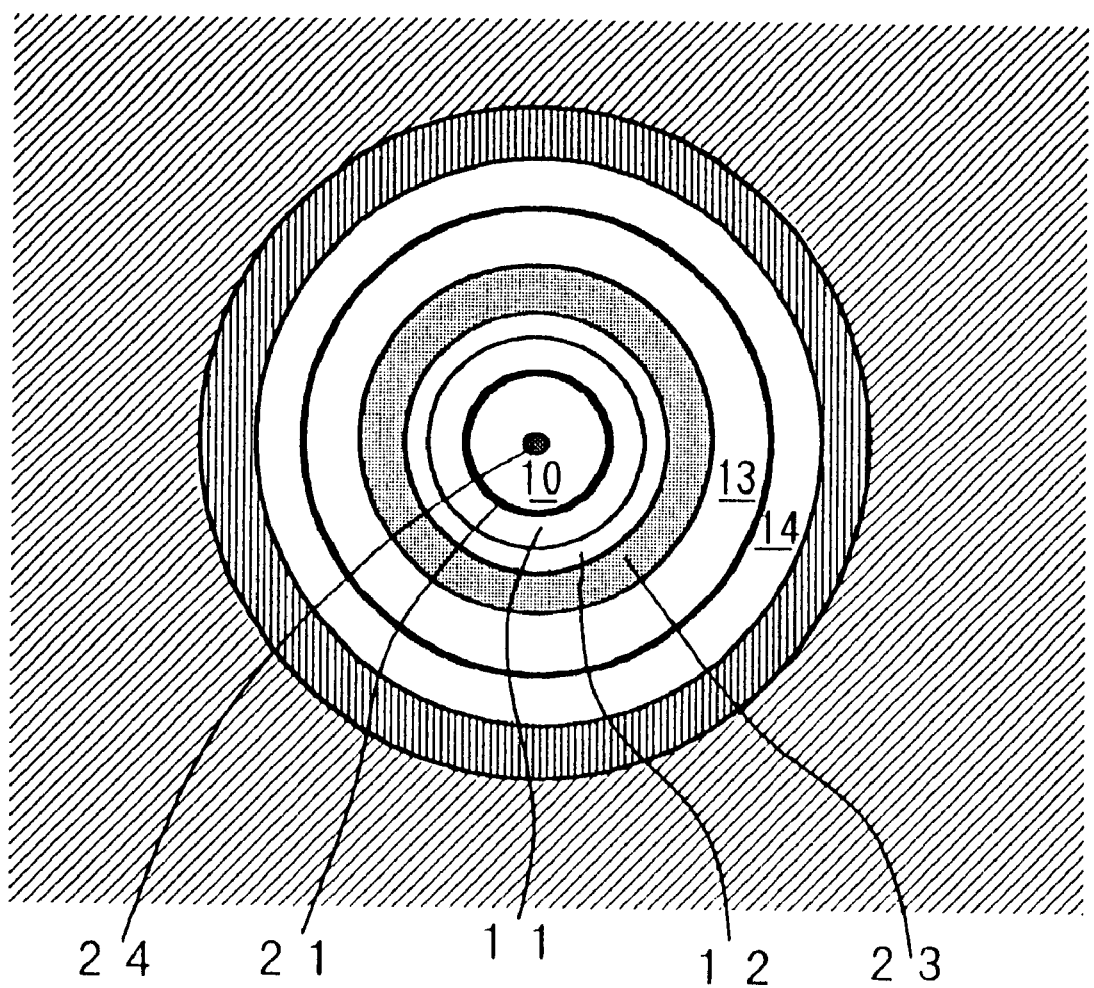
FIG. 3 is a front view of the pulverized-coal burner of FIG. 1, viewed from the furnace side.

FIG. 1 and FIG. 2 are cross sectional views of a solid fuel burner (simply burner hereafter) according to a first embodiment of the invention. FIG. 1 shows the situation in which the fuel ejected from the burner 42 at a low load is combusted in a furnace 41. FIG. 2 shows the situation in which the fuel ejected from the burner at a high load is combusted in the furnace 41. FIG. 3 is a schematic diagram of the burner 42 of FIG. 1, viewed from the furnace 41 side.

An oil gun 24 for assisting the combustion is provided at the center of the burner 42. A center air nozzle 10 for ejecting air is provided around the oil gun 24. A fuel nozzle 11 having a passage concentric with the center air nozzle 10 and ejecting the fluid mixture of fuel, in which the passage is formed concentrically, and carrier gas is provided around the center air nozzle 10. Additional air holes (not shown) or additional air nozzles 12 are provided in the inside of the outer septum 22 of the fuel nozzle 11. In the present embodiment, a plurality of additional air nozzles 12 are provided along the inside of the outer septum 22 of the fuel nozzle 11 as shown in FIG. 3, or alternatively, a plurality of additional air holes are provided on the outer septum 22. A secondary air nozzle 13 and a tertiary air nozzle 14 (collectively called an outer air nozzle, in some cases hereafter) each concentric with the fuel nozzle 11 and each for ejecting air are provided around the fuel nozzle 11. An obstacle called a flame stabilizing ring 23 is provided at the outer tip (furnace exit side) of the fuel nozzle 11. The flame stabilizing ring 23 serves as an obstacle against both the flow 16 of the mixture flow of the fuel and carrier gas (pulverized-coal flow, hereafter) ejected from the fuel nozzle 11 and the flow 17 of secondary air flowing through the secondary air nozzle 13. Accordingly, the pressure on the downstream side (furnace 41 side) of the flame stabilizing ring 23 decreases, whereby a flow is induced in this region in the direction reverse to the pulverized-coal flow 16 and the secondary air flow 17. This flow in the reversed direction is called a recirculation zones 19. High temperature gas generated by the combustion of the pulverized coal flows into the recirculation zones 19 from the downstream, and resides there. This high temperature gas is mixed with the pulverized coal at the fuel jet 16, at the exit of the burner within the furnace 41. At the same time, the pulverized-coal particles are heated up by the thermal radiation from the furnace 41, thereby being ignited.

The combustion-assisting oil gun 24 provided along the center axis of the center air nozzle 10 is used for ignition of the fuel at start-up of the burner 42. A swirler 25 for swirling the air ejected from the center air nozzle 10 is provided at the tip of the center air nozzle 10. Air is supplied to an air box 26 for supplying air, and then is supplied to the furnace 41 through the secondary air nozzle 13 and the tertiary air nozzle 14. Swirlers 27 and 28 for swirling the air flows ejected from the secondary air nozzle 13 and the tertiary air nozzle 14 are provided within the nozzles 13 and 14, respectively.

The secondary air nozzle 13 and the tertiary air nozzle 14 are separated from each other by a septum 29. The tip of the septum 29 forms a guide (sleeve) for causing the tertiary air flow 18 to be ejected at an angle relative to the pulverized-coal flow 16. A burner throat 30 forming the furnace wall serves also as the outer wall of the tertiary air nozzle 14. Water pipes 31 is provided on the furnace walls.

A passage contracting member 32 for contracting the passage in the fuel nozzle 11 is provided inside the septum 22 in the upstream side of the fuel nozzle 11. Further, a condenser 33 for concentrating the fuel to the septum 22 side of the fuel nozzle 11 is provided outside the center air nozzle 10. The condenser 33 is located on the downstream side (furnace side) of the passage contracting member 32.

The passage contracting member 32 has an effect where the flow of fuel particles (of pulverized coal) having a larger inertia than that of the fuel carrier gas (exhaust gas) is focused at the center axis region of the burner. Further, the condenser 33 provided downstream of the passage contracting member 32 has the effect that the flow of fuel particles (of pulverized coal) having been focused at the center axis region by the passage contracting member 32 is expanded by the condenser 33 and then flows through the passage of the fuel nozzle 11.

At that time, since the flow of fuel particles (of pulverized coal) which is expanded and then flows through the passage of the fuel nozzle 11 has a larger inertia than that of the fuel carrier gas (exhaust gas), the flow of fuel particles (of pulverized coal) is concentrated in the inner-wall side region of the fuel nozzle 11, and flows directed towards the exit. This concentrated flow of pulverized coal in the wall side region of the fuel nozzle 11 easily contacts with outer air (combustion air) near the exit of the fuel nozzle 11, and further contacts with the high-temperature gas of the recirculation zones 19 generated downstream of the flame stabilizing ring 23, thereby being ignited easily.

In the present embodiment, described below are the configurations of a burner 42 and a method of combustion in which exhaust gas is used as the fuel carrier gas and in which the oxygen concentration in the pulverized-coal flow 16 is low. Such a method of combustion is applicable, for example, for the combustion of brown coal and lignite.

As described above, low-coalification coal, such as brown coal and lignite, is rich in volatile matter and moisture. Such coal has a lower calorific value than that of high-coalification coal, and in addition, is generally poor in pulverizability. Further, the ash thereof has a lower melting point. The richness in volatile matter easily causes spontaneous ignition during storage and pulverization processes in air. In order to avoid such difficulty, when brown coal and lignite are pulverized and combusted, a low-oxygen concentration mixture of exhaust gas and air is used as the fuel carrier gas. At the same time, the residual heat in the exhaust gas helps evaporation of moisture in the pulverized coal.

Nevertheless, the combustion velocity of brown coal and lignite is lower in the low-oxygen concentration atmosphere than in air. Thus, when the pulverized coal, such as brown coal and lignite, is carried by the carrier gas of low oxygen concentration, the combustion velocity depends on the rapidity of mixing of the brown coal and lignite with air. This causes a slower combustion velocity than that of bituminous coal which can be carried by air. Accordingly, in the combustion of the brown coal and lignite at a low load of the burner 42 with a lower rate of fuel combustion, blow-off and extinction of the flame easily occurs in comparison with the combustion of bituminous coal. Further, in the brown coal and lignite, the time necessary to burn out is longer than that of bituminous coal. This causes an increase of unburnt carbons in the furnace exit. Thus, acceleration of the mixing of the fuel with air is necessary. When the amount of combustion is increased, that is, when the brown coal and lignite are combusted at a high load with good mixing with air, the richness in volatile matter causes an increase in the amount of combustion in the vicinity of the burner 42. Accordingly, thermal load near the burner 42 increases locally, and hence the temperature of the burner structure and the furnace wall rises by the thermal radiation. This causes a possibility that the burnt ash coheres and melts onto the burner structure and the furnace wall, thereby causing slagging thereon. The lower melting temperature of the brown coal and lignite accelerates the slagging onto the burner structure and the furnace wall.

In the present embodiment, the above-mentioned problem caused by the difference in condition of the fuel combustion at a high load and at a low load of the burner 42 when the low-coalification coal is used is resolved by adjusting the position of the flame formation depending on the burner load. That is, at a high load, the flame is formed in a position far from the burner within the furnace. In contrast, at a low load, the flame is formed starting from the exit of the fuel nozzle 11. At a low load, because of a lower thermal load of the furnace 41, the temperature of the burner 42 and the furnace wall does not rise as high in comparison with the case of a high load even when the flame is formed near the burner 42 and the furnace wall. Thus, slagging does not occur onto the burner structure and the furnace wall.

In order to form the flame starting from the exit of the fuel nozzle 11 at a low load, in the present embodiment, in addition to that the high-temperature gas is caused to reside in the recirculation zones 19 generated downstream of the flame stabilizing ring 23, air is supplied to the burner through the additional air holes or additional air nozzles 12, thereby increasing the oxygen concentration in the pulverized-coal flow 16 near the flame stabilizing ring 23. By virtue of this operation, the combustion velocity is increased in comparison with the case of low oxygen concentration, thereby accelerating the ignition of the fuel particles. Accordingly, the flame is formed starting from the vicinity of the fuel nozzle 11.

Further, air supply through the center air nozzle 10 also increases the oxygen concentration in the pulverized-coal flow 16, thereby accelerating the ignition of the pulverized coal. At that time, it is effective that the swirler 25 is provided in the center air nozzle 10 as shown in FIG. 1 so as to swirl the center air flow 15 thereby to accelerate the mixing with the pulverized-coal flow 16. When the center air flow 15 is swirled, the air flow 15 from the center air nozzle 10 is expanded outward by centrifugal force, whereby the flow velocity directed towards the furnace center is reduced. Accordingly, the residence time of the pulverized coal near the exit of the burner becomes longer. As a result, the combustion starts near the burner 42.

The center air nozzle 10 and the additional air holes or additional air nozzles 12 are preferably located upstream of the exit of the fuel nozzle 11. At that time, both the position of the center air nozzle 10 and the position of the additional air holes or additional air nozzles 12 within the fuel nozzle 11 are set preferably so that the residence time of the pulverized coal in the fuel nozzle 11 becomes shorter than the ignition delay time of the pulverized coal. The purpose of this is to prevent a back fire and burn damage in the fuel nozzle 11 caused by the ignition of the pulverized coal within the fuel nozzle 11. Measures to be used are: the ignition delay time (approximately 0.1 s) of a gas fuel the ignition delay time of which is shorter than that of the pulverized coal; and the flow velocity 10–20 m/s in the fuel nozzle 11. As a result, both the distance between the exit of the fuel nozzle 11 and the exit of the center air nozzle 10 and the distance between the exit of the fuel nozzle 11 and the exit of the additional air holes or additional air nozzles 12 are set to be approximately 1 m or less.

At a high load, thermal load near the burner is reduced by forming the flame in a position far from the burner. For this purpose, in the present embodiment, air supply from the additional air holes or additional air nozzles 12 is reduced in comparison with the case of the low load. On the other hand, air supply from the center air nozzle 10 is increased, while the air flow velocity is set to be higher than the velocity of the pulverized-coal flow 16 in the fuel nozzle 11. The reduction in the additional air supply decreases the oxygen concentration in the pulverized-coal flow 16 near the flame stabilizing ring 23 in comparison with the case of low load, thereby decelerating the combustion velocity. Accordingly, the temperature of the recirculation zones 19 generated downstream of the flame stabilizing ring 23 becomes lower, thereby suppressing the thermal radiation onto the burner structure. Further, the increase in the air flow velocity from the center air nozzle 10 increases the flow velocity of the pulverized-coal flow 16 at the exit of the fuel nozzle 11. Accordingly, the residence time of the fuel particles near the burner becomes shorter. As a result, the majority of fuel is ignited in a position far from the burner 42. By virtue of this, the thermal radiation from the flame is reduced, and slagging onto the burner structure and the furnace wall is suppressed.

In the present embodiment, the swirler 25 is provided in the center air nozzle 10 so as to swirl the center air flow 15. By virtue of this, as departing from the burner 42, the center air flow 15 is expanded outward, whereby the flow velocity is reduced. Accordingly, the air flow velocity balances with the flame propagation velocity in a position far from the burner 42, whereby the pulverized coal is combusted stably. Further, in the present embodiment, the recirculation zones 19 is generated downstream of the flame stabilizing ring 23, and then a part of the fuel is combusted within the recirculation zones 19. The flame in this region serves as a pilot flame. The obtained pilot flame can stably supply high-temperature gas to the flame formed in a position far from the burner 42, thereby stabilizing the flame in a position far from the burner 42 and hence reducing the possibility of flame extinction.

In order to reduce the NOx concentration in the exhaust gas generated by combustion of the pulverized coal, the amount of air is adjusted preferably so that the air ratio to volatile matter (the ratio of the total amount of air supplied from the fuel nozzle 11, the center air nozzle 10, and the additional air holes or additional air nozzles 12, to the amount of air necessary for complete combustion of the volatile matter contained in the fuel) is at 0.85–0.95. A majority of the pulverized coal is mixed with the air supplied by the fuel nozzle 11, and then combusted (first step). After that, the (fuel) gas is mixed with secondary air flow 17 and tertiary air flow 18, and then combusted (second step). When an after-air port 49 (see FIG. 27) for supplying air in the downstream of the burner within the furnace 41 is provided, the (fuel) gas is mixed with the air supplied from the after-air port 49, and then combusted completely (third step). The volatile matter contained in the fuel is combusted in the first step because the combustion velocity thereof is higher than that of the fixed carbon.

At that time, the air ratio to volatile matter at 0.85–0.95 causes insufficiency in oxygen concentration, but accelerates the combustion of the pulverized coal. The combustion of the pulverized coal is carried out at a high flame temperature. By virtue of the chemically reducing combustion of the pulverized coal in the oxygen-insufficient condition in the first step, the NOx generated from nitrogen contained in the pulverized coal and air is converted into harmless nitrogen, thereby causing a reduction in the NOx concentration in the exhaust gas from the furnace 41. Further, the high temperature accelerates the reaction in the second step, thereby reducing the unburnt carbon. Table 1 shows results of comparison of the NOx concentration in the exhaust gas from the furnace exit when the amount of air is varied. Here, the fuel used was brown coal, and the fuel and the fuel ratio (fixed carbon/volatile matter) was 0.82.

TABLE 1

|  | Condition A | Condition B | |
|---|---|---|---|
| Amount of fuel supply (at rated load) | 100% | 100% | |
| Oxygen concentration in fuel carrier gas (%) | 10 | 10 | |
| Air ratio to volatile matter in fuel | | | |
| Carrier gas | 0.26 | 0.26 | A |
| Center air | 0.48 | 0.53 | B |
| Additional air | 0.05 | 0.05 | C |
| Total (carrier gas + center air + additional air) | 0.79 | 0.84 | D |
| Outer air (secondary air + tertiary air) | 0.67 | 0.67 | E |
| Air ratio to fuel (volatile matter + fixed carbon) | | | |
| Total for burner (carrier gas + center air + additional air + outer air) | 0.80 | 0.82 | |
| After-air | 0.40 | 0.40 | |
| NOx concentration at furnace exit (ppm: equivalent to 6% oxygen concentration) | 165 | 150 | |

In condition B, the air ratio to volatile matter (column D in Table 1) becomes 0.84 from a value of 0.79 in condition A, and the NOx concentration is reduced.

Figure 4:
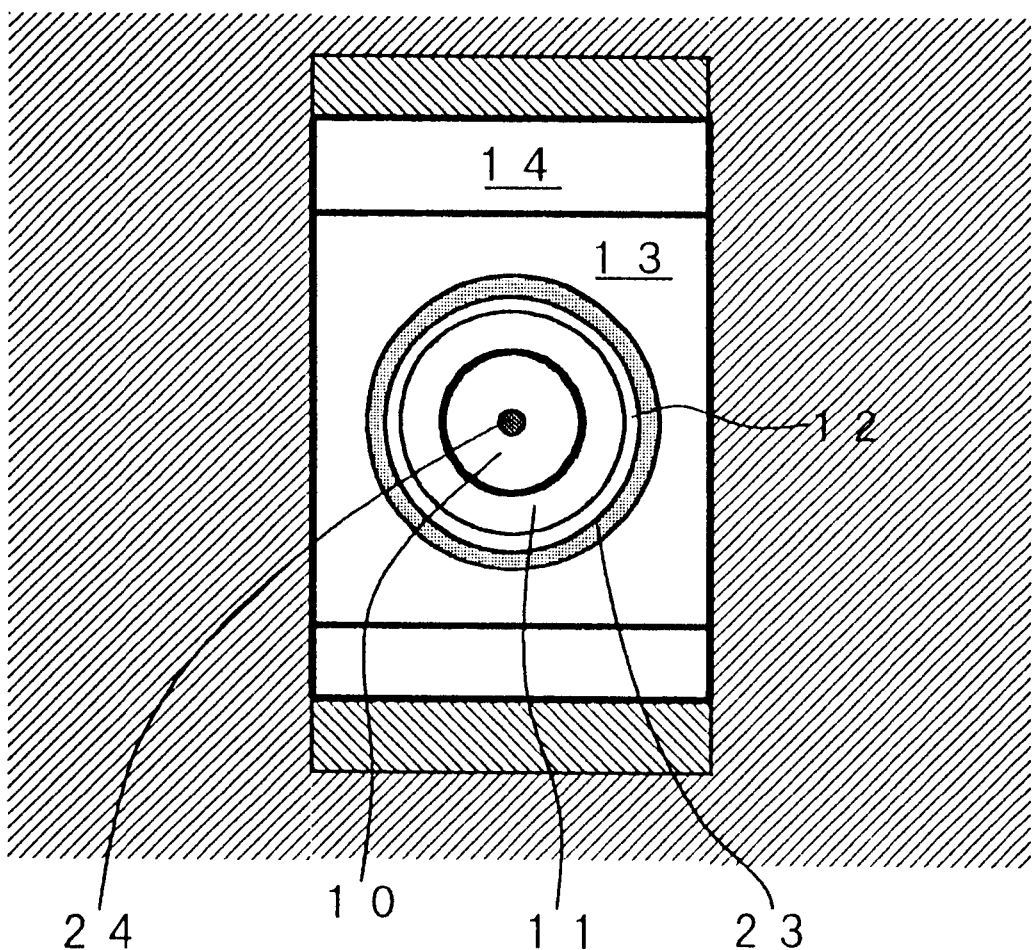
FIG. 4 is a front view of a modification of the pulverized-coal burner of FIG. 1.

The burner 42 according to the present embodiment is a cylindrical burner comprising a center air nozzle 10, a fuel nozzle 11, additional air nozzles 12, a secondary air nozzle 13, and a tertiary air nozzle 14, each being cylindrical and arranged concentrically as shown by the front view of FIG. 3 viewed from the furnace side. However, the fuel nozzle 11 may be rectangular. Further, as shown in the front view of the burner of FIG. 4 viewed from the furnace side, the fuel nozzle 11 may be surrounded by at least a part of the outer air nozzle such as the secondary air nozzle 13 and the tertiary air nozzle 14. Furthermore, as shown in the cross sectional view of the burner of FIG. 5, outer air may be supplied by a single nozzle (secondary air nozzle 13), and further may be supplied by three or more nozzles (not shown). In the present embodiment, as shown in FIG. 1 and FIG. 2, provided in the fuel nozzle 11 are both a passage contracting member 32 for contracting the passage and a condenser 33 for concentrating the fuel particles to the side of the outer septum 22 of the fuel nozzle 11. However, the same effect is obtained even the burner 42 (FIG. 5) without these structures.

Figure 5:
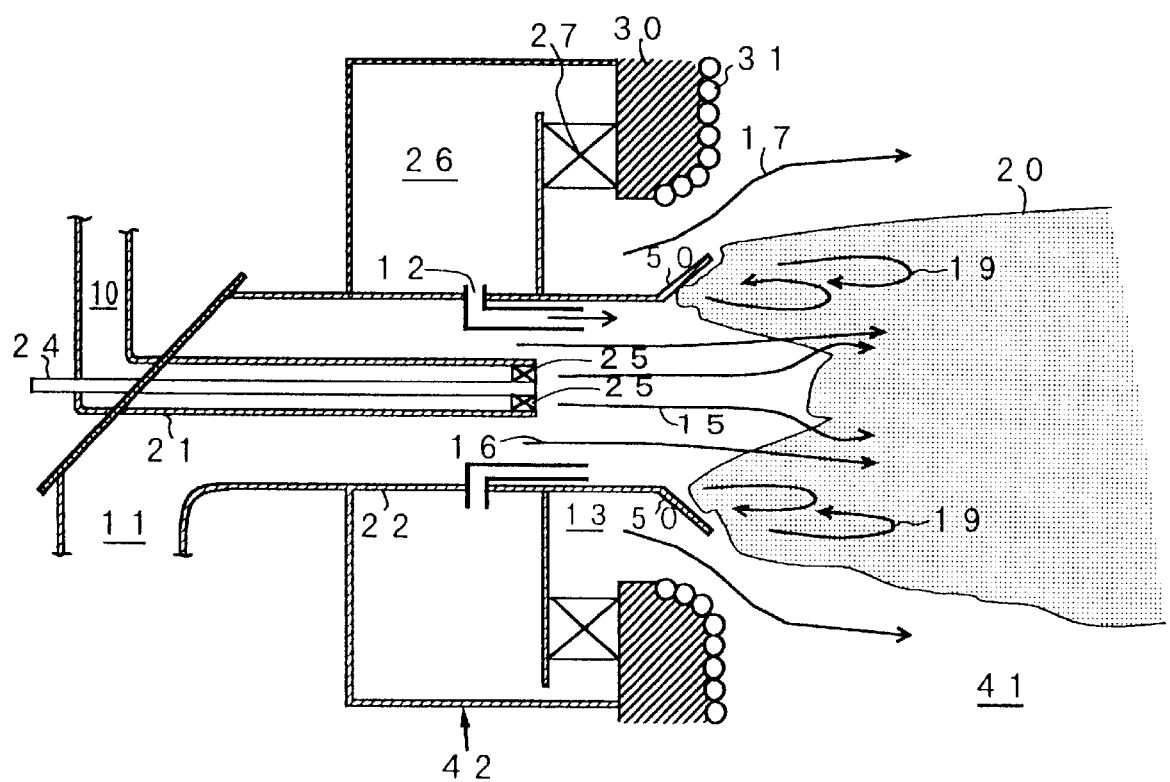
FIG. 5 is a cross sectional view of a modification of the pulverized-coal burner of FIG. 1.

Further, in the present embodiment, as shown in FIG. 1 and FIG. 2, a flame stabilizing ring 23 is provided at the tip of the outer septum 22 of the fuel nozzle 11. However, the burner 42 without a flame stabilizing ring 23 as shown in FIG. 5, a pipe-expanding member 50 may be provided for increasing swirling intensity to the outer air flow (secondary air flow 17), thereby inducing a recirculation zones 19 downstream the tip of the outer septum 22.

Figure 6:
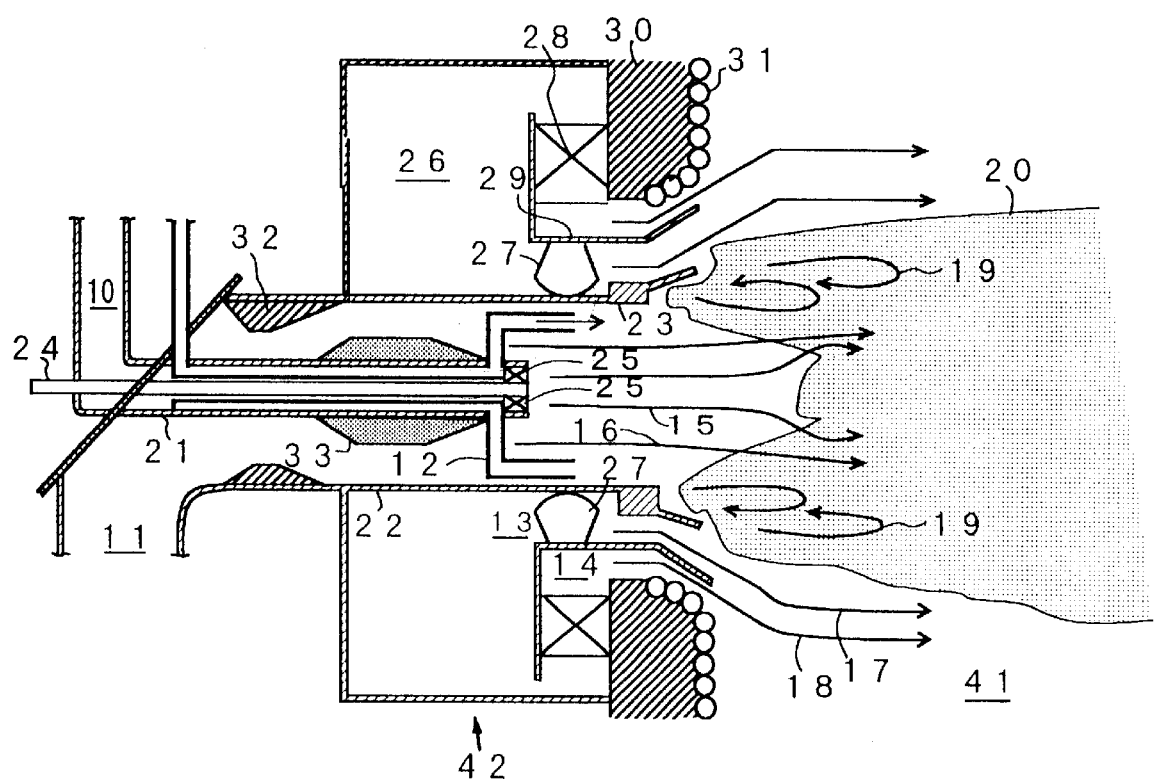
FIG. 6 is a cross sectional view of a modification of the pulverized-coal burner of FIG. 1.

A modified burner 42 of present embodiment in FIG. 1 is shown in FIG. 6. The air supplying section for the additional air nozzles 12 may be connected to a dedicated combustion-air supplying apparatus for supplying combustion air but not connected to an air box 26 in this case shown in FIG. 6. When the air supplying section for the additional air nozzles 12 is connected to the dedicated combustion-air supplying apparatus, oxygen-enriched air having an enriched oxygen concentration or pure oxygen can be easily supplied depending on the combustibility of the pulverized coal and in response to a reduction in the load of the combustion apparatus. Further, a combustion air flow rate regulating apparatus provided for a dedicated combustion-air supplying apparatus permits easy control of the supply rate.

(Second Embodiment)

Figure 7:
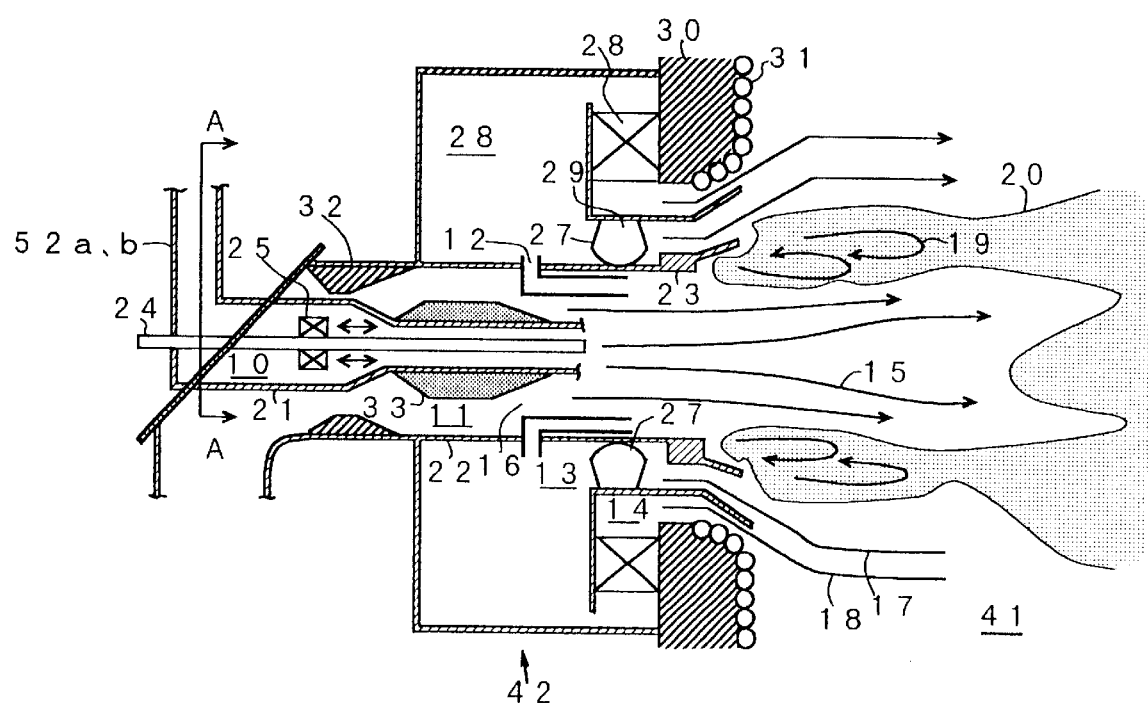
FIG. 7 is a cross sectional view of a pulverized-coal burner according to a second embodiment of the invention, at a high load.

FIG. 7 is a cross sectional view of a burner 42 according to a second embodiment of the invention. FIG. 7 shows the situation of the burner operation when the furnace 41 is operated at a high load. The second embodiment is different from the first embodiment in that the position of the swirler 25 arranged in the center air nozzle 10 can shift. The situation of the burner operation according to the present embodiment at a low load is the same as that of the first embodiment at a low load shown in FIG. 1. At this time, the swirler 25 is moved to the tip of the center air nozzle 10. The difference in the situation of the burner operation according to the present embodiment at a high load from that of the first embodiment at a high load shown in FIG. 2 is that the swirler 25 is shifted to the upstream side of the center air nozzle 10. An additional difference in the present embodiment from the first embodiment is in that when the swirler 25 is shifted to the upstream side of the center air nozzle 10, the nozzle cross section of the center air nozzle 10 becomes larger. This configuration reduces the ratio of the area covered by the swirler 25 to the area of the nozzle cross section, in comparison with the case where the swirler 25 is located at the tip (downstream side) of the center air nozzle 10.

Described below is a case where in the burner 42 according to the present embodiment, changes the swirl velocity of the center air flow 15 under the condition where the furnace 41 is at a high load.

At a high load, as a difference from the first embodiment, the swirler 25 is moved to the upstream side of the center air nozzle 10. Accordingly, the flame is formed in a position far from the burner, thereby reducing the thermal load near the burner. For this purpose, in the present embodiment, air supply from the additional air holes (not shown) or additional air nozzles 12 is reduced at a high load in comparison with the case of a low load.

Further, at a high load, the area covered by the swirler 25 in the center air nozzle 10 increases in comparison with that at a low load, whereby the swirl intensity in the air flow from the center air nozzle 10 is reduced. Accordingly, the center air flow 15 does not spread as wide after ejection through the nozzle 10 into the furnace 41 in comparison with the case of high swirl intensity. Thus, the residence time of the fuel particles near the burner becomes shorter, and hence the amount of fuel combusted near the burner decreases. By virtue of this, the thermal radiation from the flame onto the burner structure and the furnace wall is reduced, and slagging onto the burner structure and the furnace wall is suppressed. At the same time, the temperature of the recirculation zones 19 downstream of the flame stabilizing ring 23 becomes lower according to the decrease in thermal radiation from the flame.

In the present embodiment, described above was the effect in the case of changing the swirl velocity of the center air flow 15. However, in addition to this changing, the amount of air supply to each air nozzle 10–14 may be changed as described above in the first embodiment. The effect is the same as that of the first embodiment.

Figure 8:
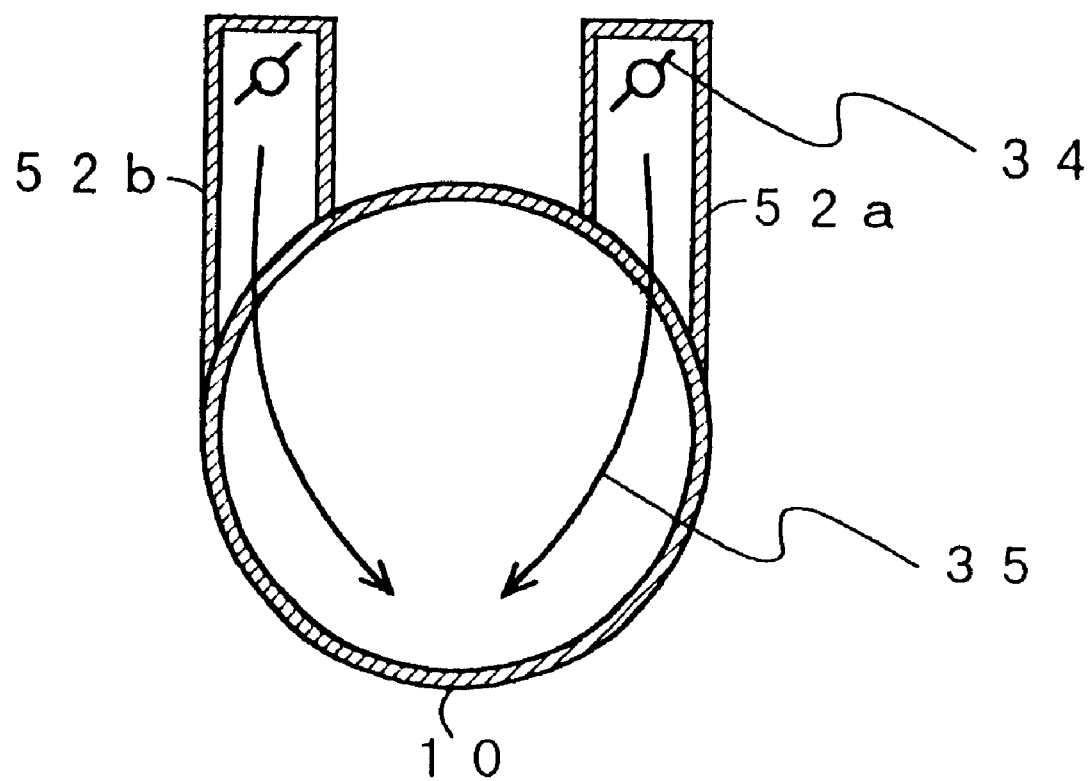
FIG. 8 is a cross sectional view of the pulverized-coal burner of FIG. 7, along the line A—A.

The present embodiment shows the case where the air flow ejected from the center air nozzle 10 is swirled by a swirler 25 in which vanes tilted relative to the air flow induces the swirl intensity. Further, in the present embodiment, the swirl intensity is changed by changing the position of the swirler 25 within the center air nozzle 10 and thereby changing the ratio of the area covered by the swirler 25 to the area of the nozzle cross section. However, the swirl intensity may be changed by changing the tilt angle of the vanes of the swirler. Further, the swirl intensity may be changed by a method in which as shown in the cross sectional view of the center air nozzle 10 of FIG. 8, the pipe 52 upstream the center air nozzle 10 is separated into two pipes 52a and 52b and in which air is introduced in the tangential direction relative to the cross section of the center air nozzle 10. In this case, the swirl intensity is canceled out at a high load by using both the two opposing pipes 52a and 52b, while the swirl intensity is increased at a low load by using mainly one of the two pipes 52a and 52b for entering air.

(Third Embodiment)

Figure 9:
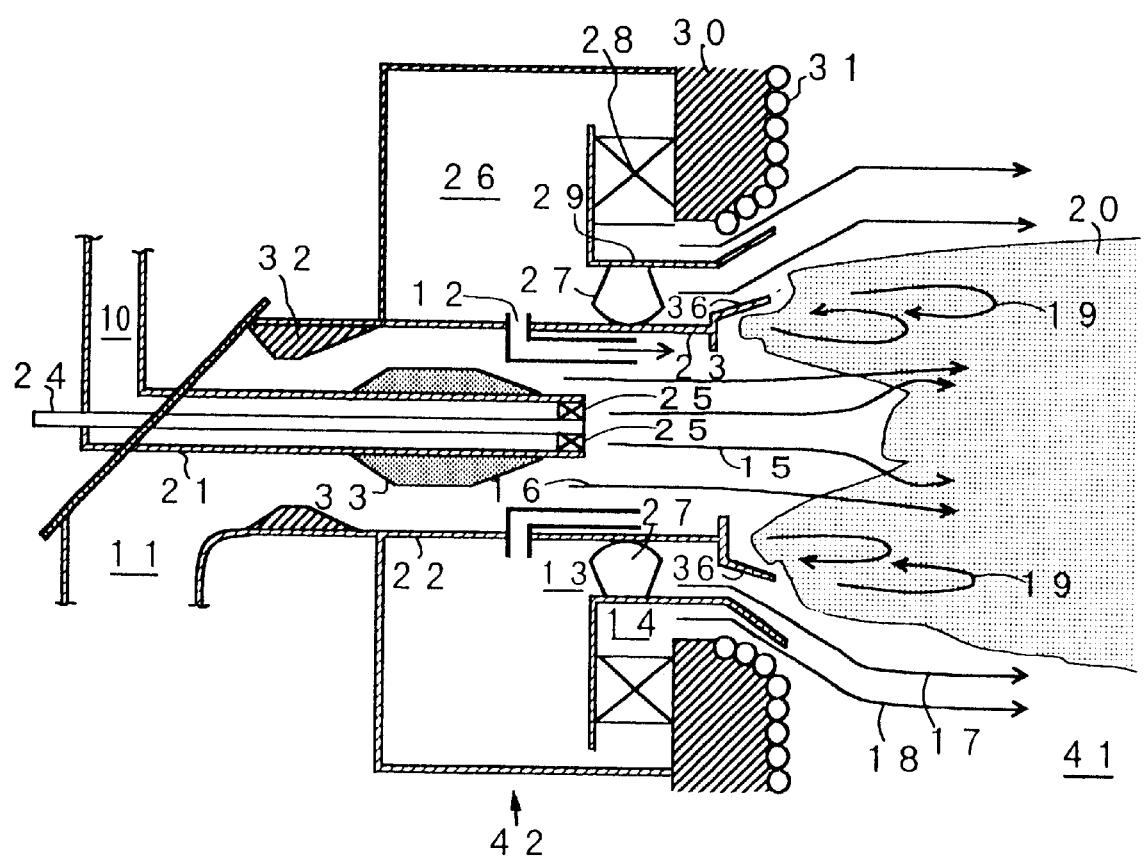
FIG. 9 is a cross sectional view of a pulverized-coal burner according to a embodiment of the invention.
Figure 10:
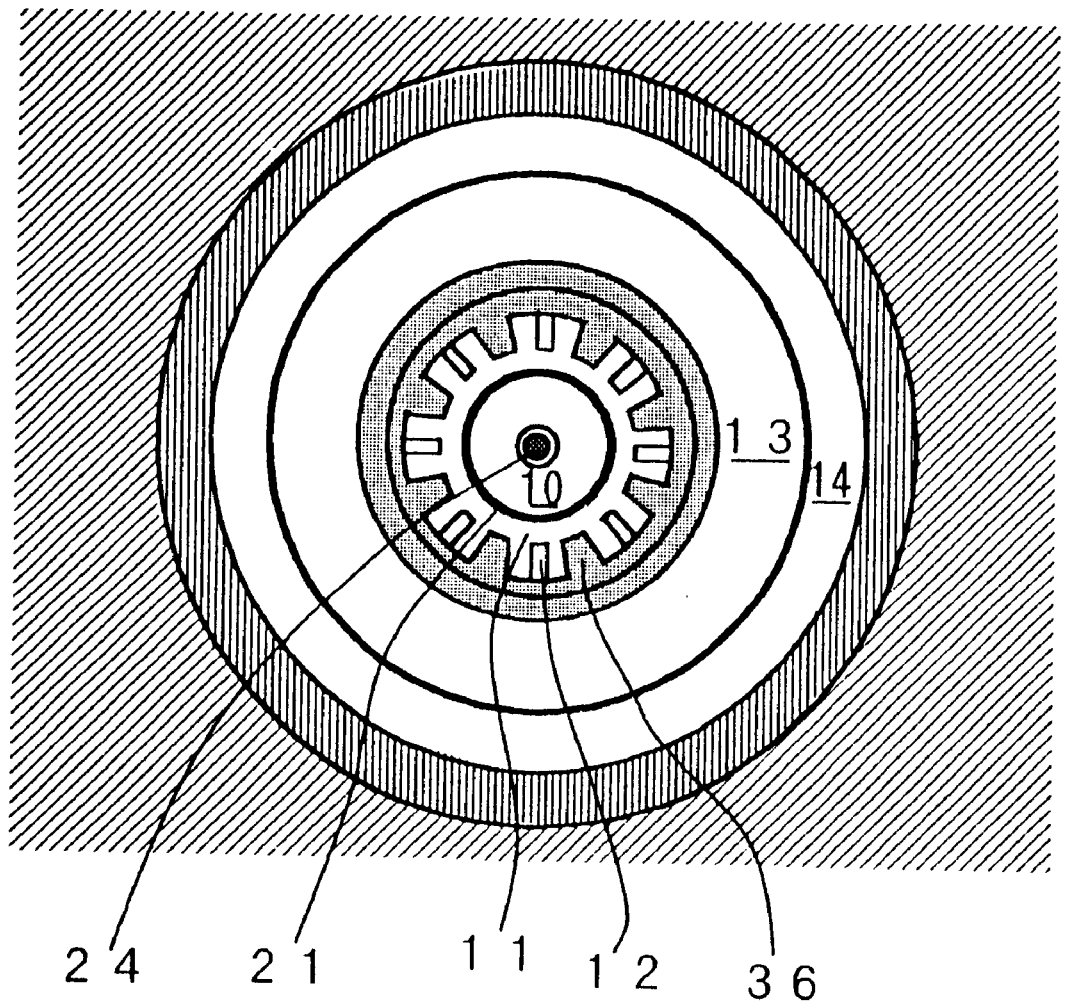
FIG. 10 is a front view of the pulverized-coal burner of FIG. 9, viewed from the furnace side.

FIG. 9 is a cross sectional view of a burner for combusting the solid fuel of coal such as brown coal and lignite, according to a third embodiment of the invention. FIG. 10 is a front view of the burner viewed from the furnace side.

Fluid mixture of pulverized-coal fuel and exhaust gas is supplied to a furnace 41 through a fuel nozzle 11. An L-shaped from side view flame stabilizing ring(An L-shaped flame stabilizing ring)36 having shark-tooth shaped protrusions is provided at the tip of the fuel nozzle 11. A recirculation zones 19 is formed downstream of the stabilizer, whereby a flame is formed starting from the vicinity of the burner. The burner shown in FIG. 9 is characterized in that additional air holes (not shown) or additional air nozzles 12 are provided so that ignition air is introduced between the shark-tooth shaped flame stabilizing ring 36 (see FIG. 10). By virtue of this, ignition is easily triggered around each the shark-tooth shaped flame stabilizing ring 36 (ignition occurs downstream the shark-tooth shaped flame stabilizing ring 36.

(Fourth Embodiment)

Figure 11:
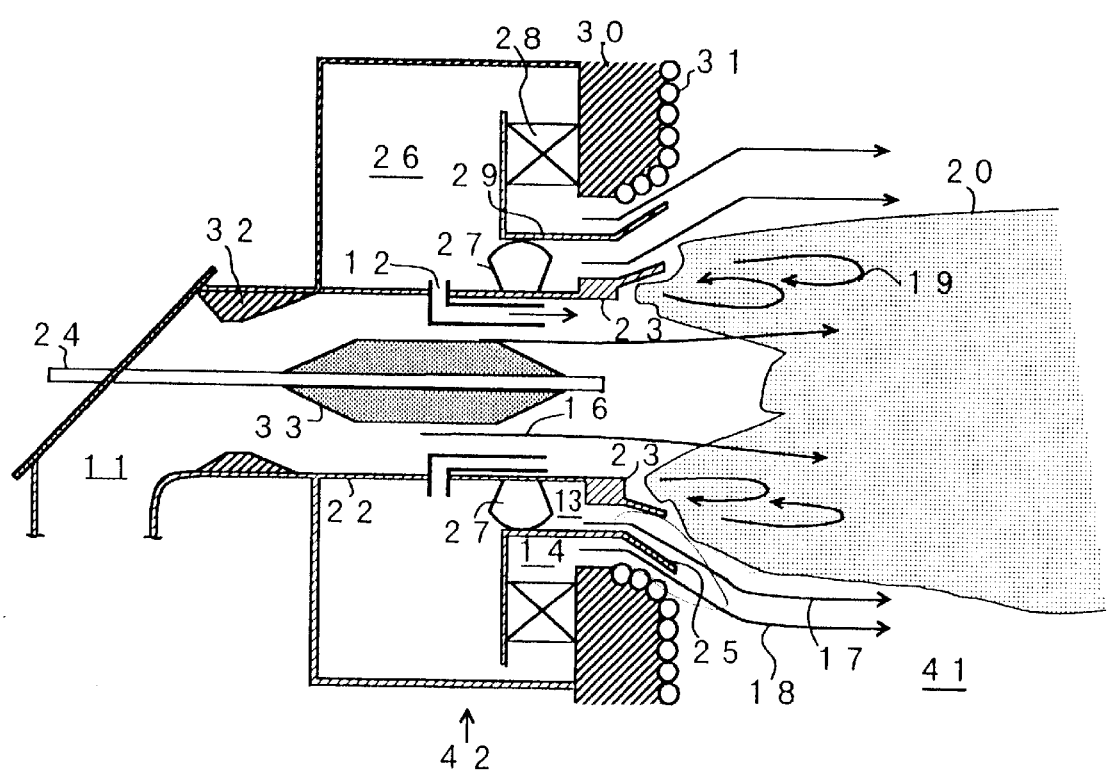
FIG. 11 is a cross sectional view of a solid fuel burner according to a fourth embodiment of the invention, at a low load.
Figure 12:
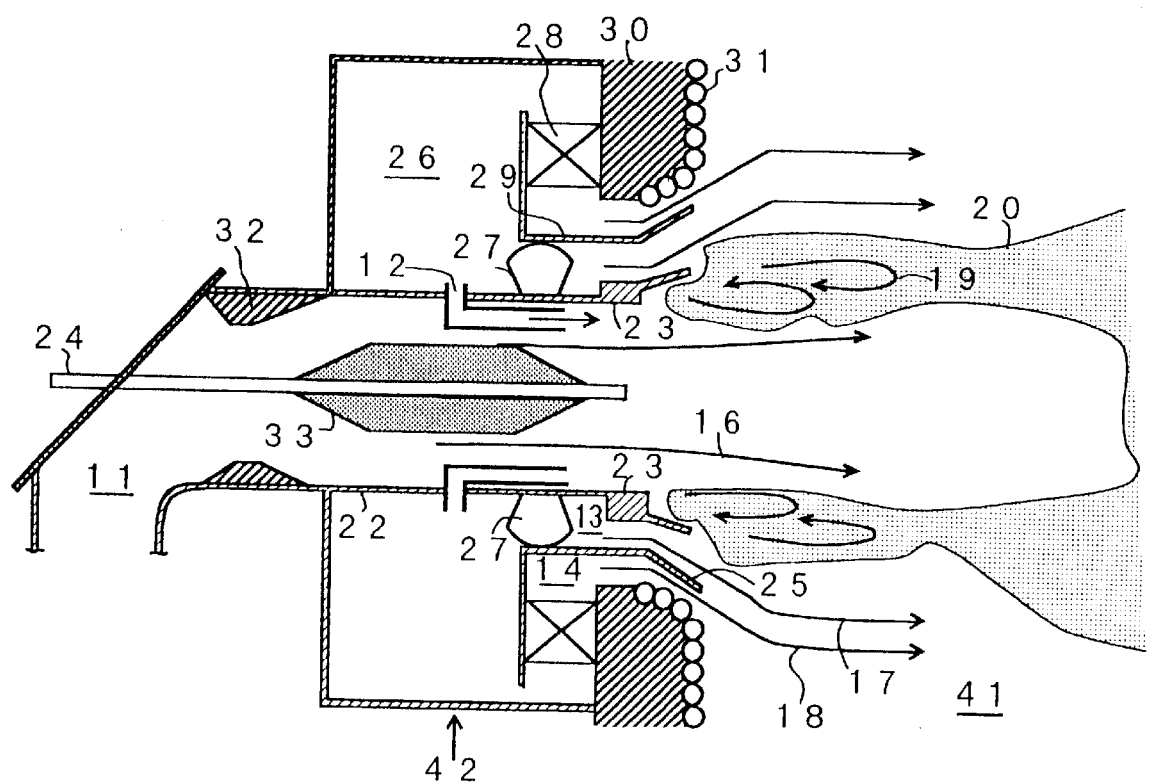
FIG. 12 is a cross sectional view of the solid fuel burner of FIG. 11, at a high load.
Figure 13:
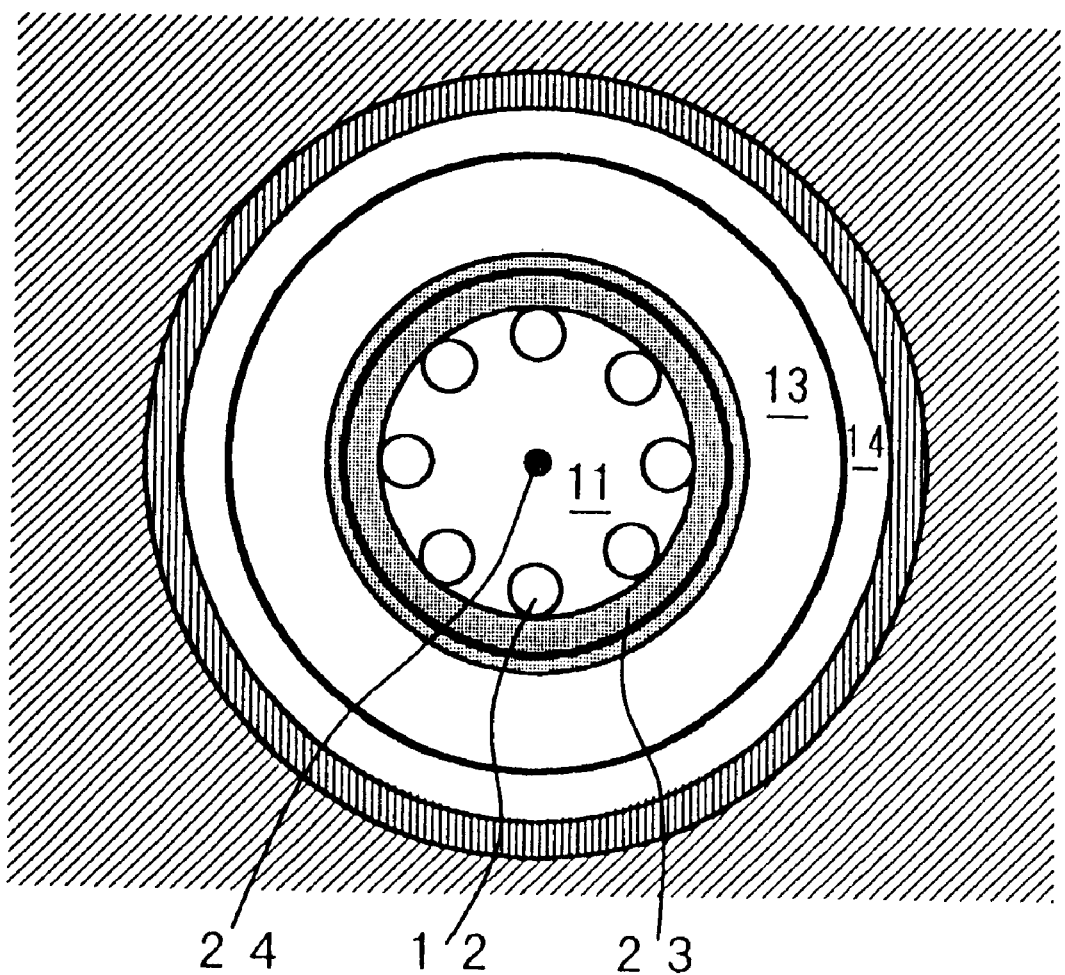
FIG. 13 is a front view of the solid fuel burner of FIG. 11, viewed from the furnace side.
Figure 14:
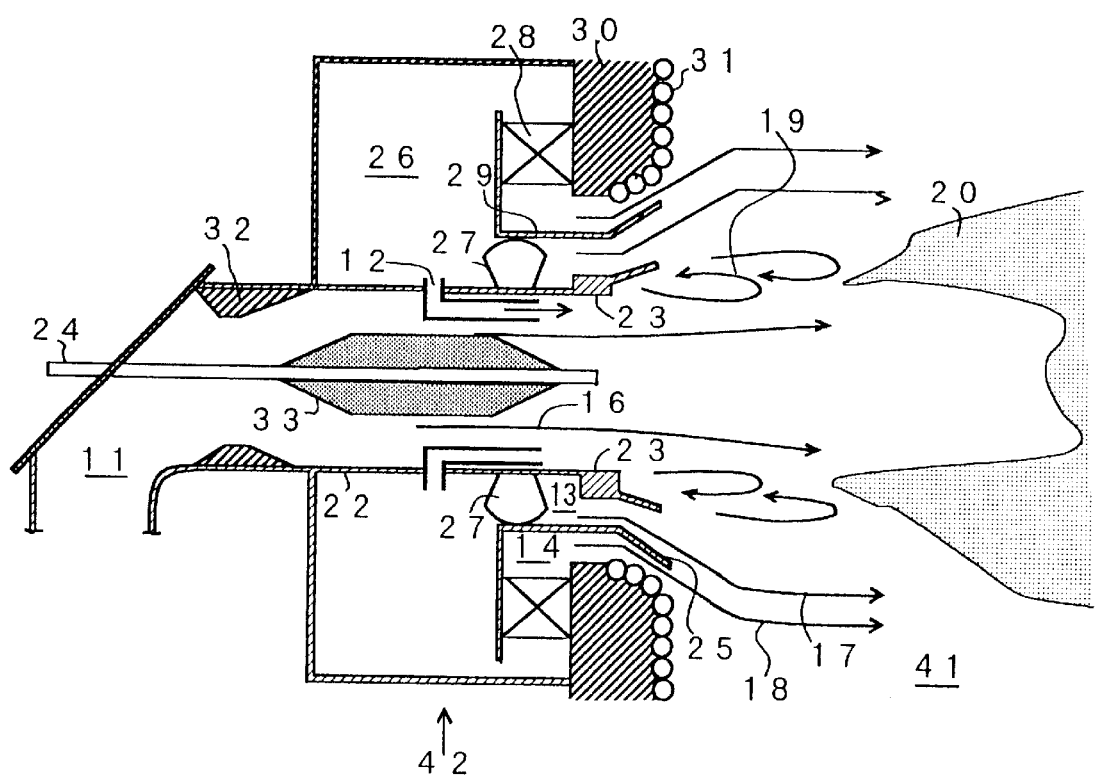
FIG. 14 is a cross sectional view of a modification of the solid fuel burner of FIG. 11, at a high load.

FIG. 11 and FIG. 12 are cross sectional views of a burner 42 according to a fourth embodiment of the invention. FIG. 11 shows the situation in which the fuel ejected from the burner 42 at a low load is combusted in a furnace 41. FIG. 12, FIG. 14, FIG. and 14 show the situation in which the fuel ejected from the burner 42 at a high load is combusted in the furnace 41. FIG. 13 is a schematic diagram of the burner 42 of FIG. 11, viewed from the side of the furnace 41.

In the burner 42 according to the fourth embodiment, an oil gun 24 for assisting the combustion is provided at the center. A fuel nozzle 11 for ejecting the fluid mixture of fuel and carrier gas is provided around the oil gun 24. A plurality of additional air holes (not shown) or additional air nozzles 12 are provided along the inside of the outer wall surface 22 of the fuel nozzle 11. A secondary air nozzle 13 and a tertiary air nozzle 14 each concentric with the fuel nozzle 11 and each for spouting air are provided around the fuel nozzle 11. A flame stabilizing ring 23 is provided at the outer tip (furnace exit side) of the wall surface of the fuel nozzle 11. The flame stabilizing ring 23 serves as an obstacle against both the flow 16 of pulverized-coal flow ejecting from the fuel nozzle 11 and the flow 17 of secondary air flowing through the secondary air nozzle 13. Accordingly, the pressure on the downstream side (the side of furnace 41) of the flame stabilizing ring 23 decreases, whereby a recirculation zones 19 is induced in this region in the direction reverse to the pulverized-coal flow 16 and the secondary air flow 17. Within the recirculation zones 19, fuel particles are heated up by thermal radiation from the furnace 41, thereby being ignited.

When a guide 25 for guiding the outer air flow so as to direct outward relative to the center axis of the burner 42 is provided in the exit of the outer air nozzle (secondary air nozzle 13, tertiary air nozzle 14, and the like), the recirculation zones 19 is formed more easily in cooperation with the flame stabilizing ring 23.

The combustion-assisting oil gun 24 provided along the center axis of the fuel nozzle 11 is used for ignition of the fuel at start-up of the burner 42. Swirlers 27 and 28 for swirling air flows ejected from the secondary air nozzle 13 and the tertiary air nozzle 14 are provided within the nozzles 13 and 14, respectively.

The secondary air nozzle 13 and the tertiary air nozzle 14 are separated from each other by a septum 29. The tip of the septum 29 forms a guide 25 for guiding the tertiary air flow 18 so as to direct outward relative to the pulverized-coal flow 16. A burner throat 30 forming the wall of the furnace 41 serves also as the outer wall of the tertiary air nozzle 14. Water pipes 31 are provided on the walls of the furnace 41.

A passage contracting member 32 for contracting the passage provided in the fuel nozzle 11 is inside the septum 22 in the upstream of the fuel nozzle 11. Further, a condenser 33 for concentrating the fuel to the side of the septum 22 of the fuel nozzle 11 is provided outside the oil gun 24. The condenser 33 is located on the downstream side of the burner 42 (furnace 41 side) of the passage contracting member 32.

In the present embodiment, described below are the configurations of a burner 42 and a method for combustion of brown coal and lignite, in which the exhaust gas from the furnace 41 is used as the fuel carrier gas and in which the oxygen concentration in the pulverized-coal flow 16 is low.

In the present embodiment, the problem of blow-off and extinction of the flame at a low load and the problem of ash cohesion and fusion onto the burner structure at a high load, both caused by the difference in the conditions of fuel combustion at a high load and low load of the burner 42 when low-coalification coal is used, is resolved by adjusting the position of the flame formation in the furnace 41 depending on the load to the burner 42. That is, at a high load, the flame is formed in a position far from the burner 42 within the furnace 41. In contrast, at a low load, the flame is formed within the furnace 41 starting from the vicinity of the exit of the fuel nozzle 11. At a low load, because of a lower thermal load of the furnace 41, the temperature of the burner 42 and the wall of the furnace 41 around the burner 42 do not rise as high in comparison with the case of high load even when the flame is formed near the burner 42 and the wall of the furnace 41. Thus, slagging does not occur around the burner structure and the wall of the furnace 41.

In order to form the flame within the furnace 41 starting from the vicinity of the exit of the fuel nozzle 11 at a low load, in the present embodiment, in addition to that the high-temperature gas is caused to reside in the recirculation zones 19 generated downstream of the flame stabilizing ring 23 and the guide 25, air is supplied through the additional air holes (not shown) or additional air nozzles 12, thereby increasing the oxygen concentration in the pulverized-coal flow 16 near the flame stabilizing ring 23. By virtue of this operation, the combustion velocity is increased in comparison with the case of low oxygen concentration, thereby accelerating the ignition of the fuel particles. Accordingly, the flame is formed within the furnace 41 starting from the vicinity of the fuel nozzle 11.

The additional air holes (not shown) or additional air nozzles 12 are preferably located upstream of the tip (exit of the furnace 41) of the fuel nozzle 11. At that time, the position of the additional air holes or additional air nozzles 12 within the fuel nozzle 11 is set preferably so that the residence time of the fuel in the fuel nozzle 11 becomes shorter than the ignition delay time of the fuel. The purpose of this is to prevent a back fire and burn damage in the fuel nozzle 11 caused by the ignition of the fuel within the fuel nozzle 11. Measures to be used are: the ignition delay time (approximately 0.1 s) of a gas fuel the ignition delay time of which is shorter than that of the pulverized coal; and the flow velocity 10–20 m/s in the fuel nozzle 11. For example, the distance between the exit of the fuel nozzle 11 and the exit of the additional air holes (not shown) or additional air nozzles 12 is set to be approximately 1 m or less.

At a high load of the furnace 41, thermal load near the burner 42 is reduced by forming the flame within the furnace 41 in a position far from the burner 42. For this purpose, in the present embodiment, air supply from the additional air holes (not shown) or additional air nozzles 12 is reduced in comparison with the case of low load. The reduction in the additional air supply decreases the oxygen concentration in the pulverized-coal flow 16 near the flame stabilizing ring 23 in comparison with the case of low load, thereby decelerating the combustion velocity. Accordingly, the temperature of the recirculation zones 19 generated downstream of the flame stabilizing ring 23 becomes lower, thereby suppressing the thermal radiation onto the structure of the burner 42. Accordingly, slagging is suppressed.

In the present embodiment, the recirculation zones 19 is generated downstream of the flame stabilizing ring 23, and then a part of the fuel is combusted within the recirculation zones 19. The flame in this region serves as a pilot flame. The obtained pilot flame can stably supply high-temperature gas to the flame formed in a position within the furnace 41 far from the burner 42, thereby stabilizing the flame in the position far from the burner 42 and hence reducing the possibility of flame extinction.

FIG. 23($a$) shows the situation in which the flame of the burner 42 is formed in a position far from the recirculation zones 19 downstream of the flame stabilizing ring 23 at a high load of the furnace 41. In this case, in order to reduce the possibility of flame extinction, the flames are preferably mixed with each other within the furnace 41, thereby permitting stable combustion in the furnace, as shown in the cross sectional plan view of a combustion apparatus (furnace 41) using the burners 42 according to the invention. FIG. 23($a$) shows the case where a burner 42 is arranged at each of the four corners of the furnace 41. However, the operation is the same also in the opposed firing method in which a burner 42 is arranged in each of the opposing walls of the furnace 41.

In order to reduce the NOx concentration in the exhaust gas generated by the combustion, the amount of air is adjusted preferably so that the air ratio to volatile matter (the ratio of the total amount of air supplied from the fuel nozzle 11 and the additional air holes or additional air nozzles 12, to the amount of air necessary for the complete combustion of the volatile matter contained in the fuel) is at 0.85–0.95. A majority of the fuel is mixed with the air supplied by the additional air holes or additional air nozzles 12 in the fuel nozzle 11, and then combusted (first step). After that, the (fuel) gas is mixed with secondary air flow 17 and tertiary air flow 18, and then combusted (second step). When an after-air port 49 (see FIG. 27) for supplying air is provided in the downstream of the burner 42 within the furnace 41, the (fuel) gas is mixed with the air supplied from the after-air port 49, and then combusted completely (third step). The volatile matter contained in the fuel is combusted in the first step because the combustion velocity thereof is higher than that of the fixed carbon.

At that time, the air ratio to volatile matter at 0.85–0.95 causes insufficiency in oxygen concentration, but accelerates the combustion of the fuel. The combustion is carried out at a high flame temperature. By virtue of chemically reducing combustion of the fuel in the oxygen-insufficient condition in the first step, the NOx generated from nitrogen contained in the fuel and air is converted into harmless nitrogen, thereby causing a reduction in the NOx concentration in the exhaust gas from the furnace 41. Further, the reaction in the second step is accelerated, thereby reducing the unburnt carbon. Table 2 shows results of the comparison of the NOx concentration in the exhaust gas from the furnace 41 exit when the amount of air is varied. Here, the fuel used was brown coal, and the fuel ratio (fixed carbon/volatile matter) was 0.82.

In condition B, the air ratio to volatile matter (column C in Table 2) becomes 0.85 from the value of 0.70 in condition A, and the NOx concentration in the flame is reduced.

TABLE 2

|  | Condition A | Condition B |  |
| --- | --- | --- | --- |
| Amount of fuel supply (at rated load) | 100% | 100% |  |
| Oxygen concentration in fuel carrier gas (%) | 10 | 10 |  |
| Air ratio to volatile matter in fuel |  |  |  |
| Carrier gas | 0.50 | 0.50 | A |
| Center air | 0.20 | 0.35 | B |
| Additional air | 0.70 | 0.85 | C |
| Total (carrier gas + center air + additional air) | 0.76 | 0.76 | D |
| Outer air (secondary air + tertiary air) |  |  |  |
| Air ratio to fuel (volatile matter + fixed carbon) |  |  |  |
| Total for burner (carrier gas + center air + additional air + outer air) | 0.80 | 0.84 |  |
| After-air | 0.40 | 0.40 |  |
| NOx concentration at furnace exit (ppm: equivalent to 6% oxygen concentration) | 170 | 155 |  |

Figure 15:
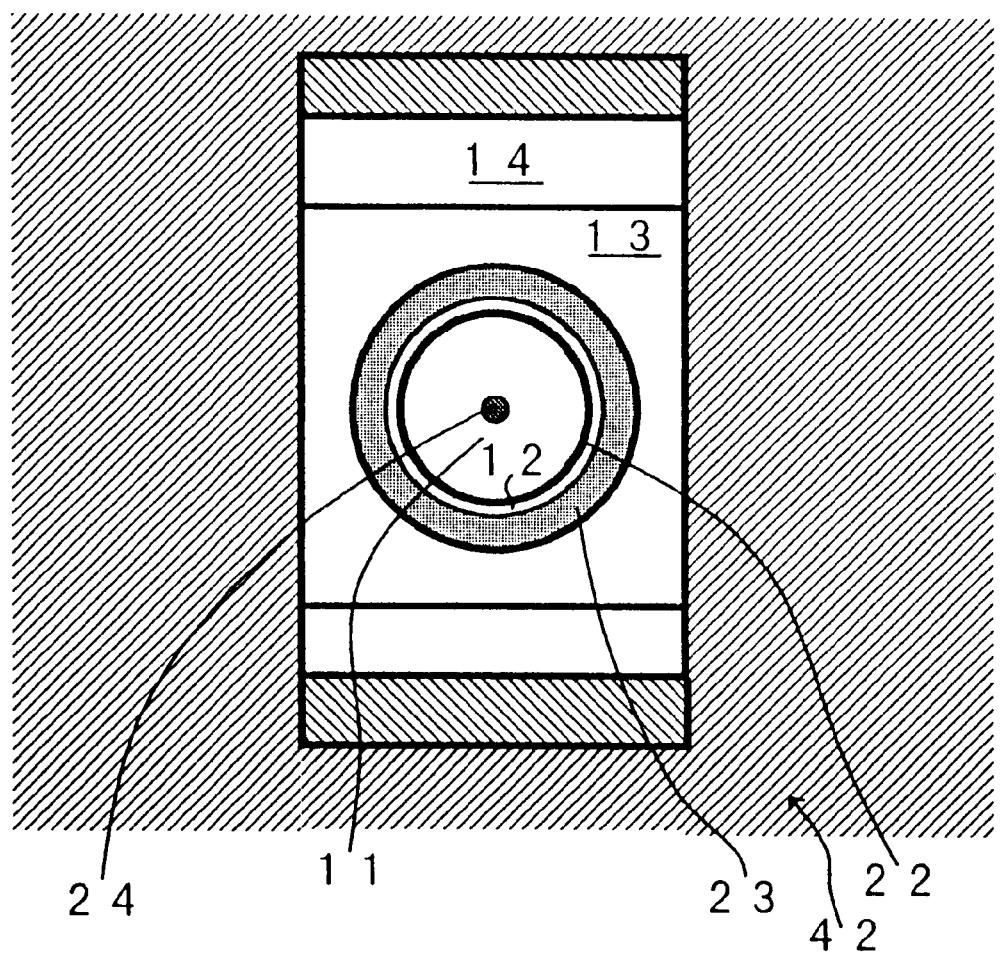
FIG. 15 is a front view of a modification of the solid fuel burner of FIG. 11, viewed from the furnace side.

The burner 42 according to the present embodiment is a cylindrical burner comprising a fuel nozzle 11, a secondary air nozzle 13, and a tertiary air nozzle 14, each being cylindrical and arranged concentrically as shown in the front view of FIG. 13 viewed from the side of the furnace 41. However, the fuel nozzle 11 and the condenser 33 may be rectangular. Further, as shown in FIG. 15 (front view of the burner 42 viewed from the side of the furnace 41), the fuel nozzle 11 may be surrounded by at least a part of the outer air nozzle such as the secondary air nozzle 13 and the tertiary air nozzle 14. Furthermore, as shown in the burner 42 of FIG. 15, the additional air holes or additional air nozzles 12 may be positioned by a single nozzle along the inner side of the wall 22 of the fuel nozzle 11.

Figure 16:
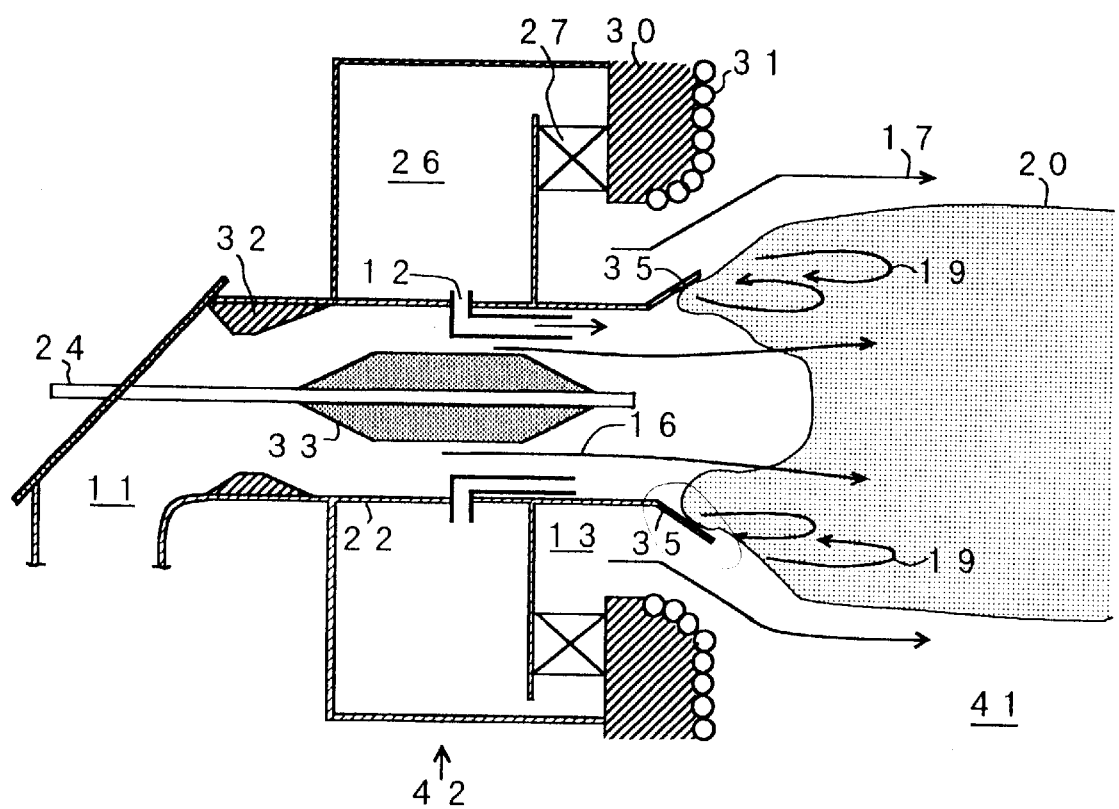
FIG. 16 is a cross sectional view of a modification of the solid fuel burner of FIG. 11.

Further, as shown in the cross sectional view of the burner 42 of FIG. 16, outer air may be supplied by a single nozzle (secondary air nozzle 13), and may be further supplied by three or more nozzles (not shown). In the present embodiment, as shown in FIG. 11 and FIG. 12, provided in the fuel nozzle 11 are both a passage contracting member 32 for contracting the passage and an obstacle (condenser) 33 for concentrating the fuel particles to the inside of the wall surface 22 of the fuel nozzle 11. However, the same effect as that of the burner 42 shown in FIG. 11–FIG. 15 is obtained even without these structures.

Further, in the present embodiment, as shown in FIG. 11 and FIG. 12, a flame stabilizing ring 23 is provided at the tip of the wall surface 22 of the fuel nozzle 11. However, as shown in FIG. 16, a guide 35 for guiding the outer air flow (secondary air flow 17) so as to direct outward relative to the fuel nozzle 11 may be provided, thereby generating a recirculation zones 19 near the rear (center side of the furnace 41) of the guide 35.

(Fifth Embodiment)

Figure 17:
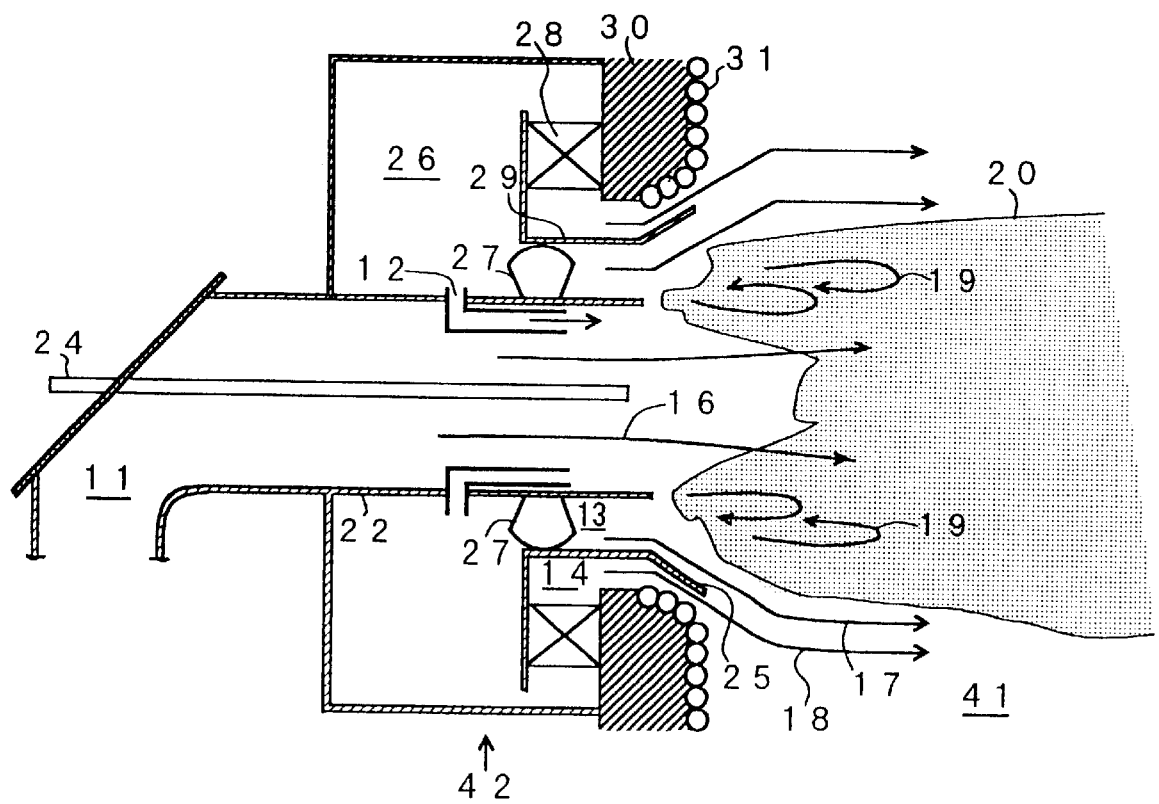
FIG. 17 is a cross sectional view of a solid fuel burner according to a fifth embodiment of the invention, at a low load.
Figure 18:
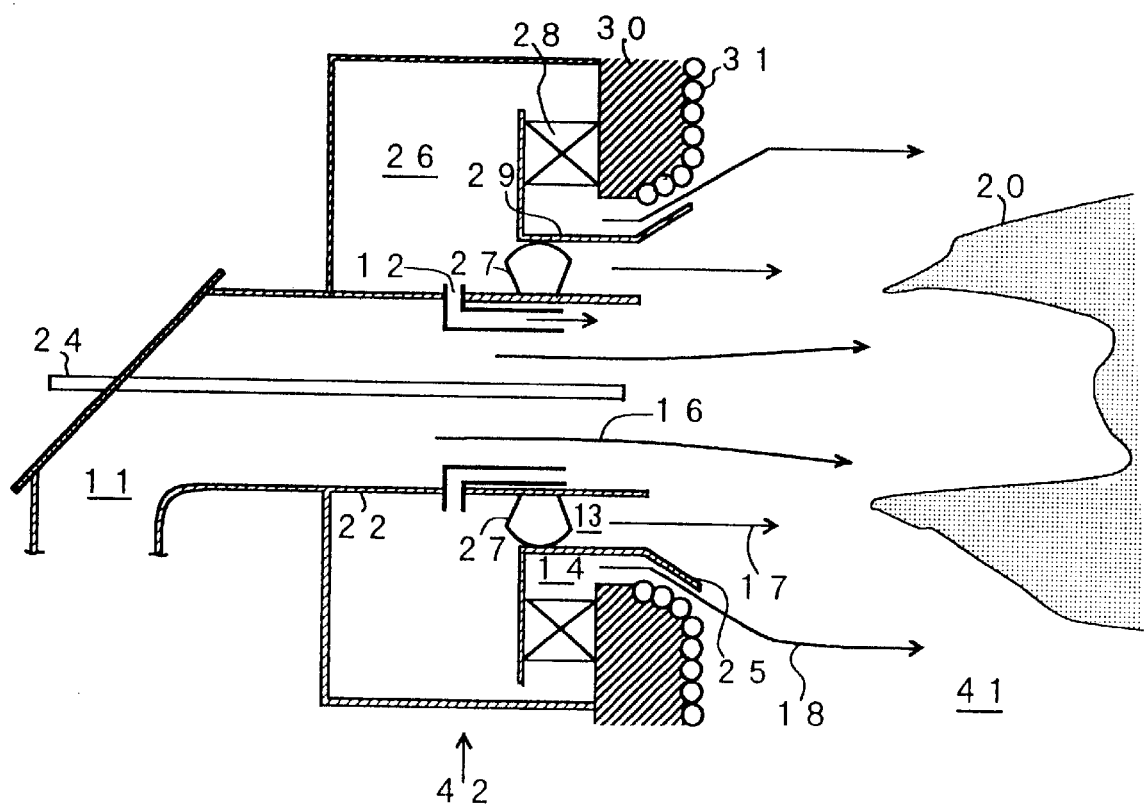
FIG. 18 is a cross sectional view of the solid fuel burner of FIG. 17, at a high load.

FIG. 17 and FIG. 18 are cross sectional views of a burner 42 according to a fifth embodiment of the invention. FIG. 17 shows the situation in which the fuel ejected from the burner 42 at a low load is combusted in a furnace 41. FIG. 18 shows the situation in which the fuel ejected from the burner 42 at a high load is combusted in the furnace 41.

The major difference of the present embodiment from the fourth embodiment is that neither flame stabilizing ring 23 nor guide 35 is provided at the tip of the wall surface 22 of the fuel nozzle 11. In order to adjust the flame profile without the flame stabilizing ring 23 and the guide 35, a swirler 27 is provided in a secondary air passage.

A flame is formed starting from the exit of the fuel nozzle 11 at a low load of the furnace 41. For this purpose, air is supplied through the additional air holes (not shown) or additional air nozzles 12, thereby increasing the oxygen concentration in the pulverized-coal flow 16 near the septum 22 of the fuel nozzle 11. By virtue of this operation, the combustion velocity is increased in comparison with the case of low oxygen concentration, thereby accelerating the ignition of the fuel particles. Accordingly, the flame is formed starting from the vicinity of the fuel nozzle 11.

In the present embodiment, secondary air is intensely swirled (at a swirl number of 1 or higher) by the swirler 27 provided in the secondary air nozzle 13. By virtue of the centrifugal force of the swirl, the secondary air flow 17 after being ejected expands in the direction departing from the pulverized-coal flow 16. At that time, the pressure decreases in the region between the pulverized-coal flow 16 and the secondary air flow 17, whereby recirculation zoness 19 are induced in the direction reverse to the pulverized-coal flow 16 and the secondary air flow 17. Further, when a damper (not shown) for reducing the flow rate is provided in the secondary air nozzle 13 so as to reduce the secondary air flow rate to nearly zero, recirculation zoness 19 are induced between the tertiary air flow 18 in the tertiary air nozzle 14 and the pulverized-coal flow 16.

At a high load of the furnace 41, thermal load near the burner 42 is reduced by forming the flame within the furnace 41 in a position far from the burner 42. For this purpose, air supply from the additional air holes or additional air nozzles 12 is reduced in comparison with the case of the low load. The reduction in the additional air supply decreases the oxygen concentration in the pulverized-coal flow 16 near the wall surface 22 of the fuel nozzle 11 in comparison with the case of the low load, thereby decelerating the combustion velocity. Further, in the present embodiment, the swirl intensity provided to the secondary air by the swirler 27 in the secondary air nozzle 13 is reduced. Then, the secondary air flow 17 after being ejected from the secondary air nozzle 13 flows in parallel to the pulverized-coal flow 16, whereby no recirculation zones 19 in the reverse direction is induced in the region between the pulverized-coal flow 16 and the secondary air flow 17. Further, when the damper (not shown) provided in the secondary air nozzle 13 is opened so as to increase the secondary air flow rate, no recirculation zones 19 in the reverse direction can be prevented from being induced in the region between the pulverized-coal flow 16 and the secondary air flow 17.

(Sixth Embodiment)

Figure 19:
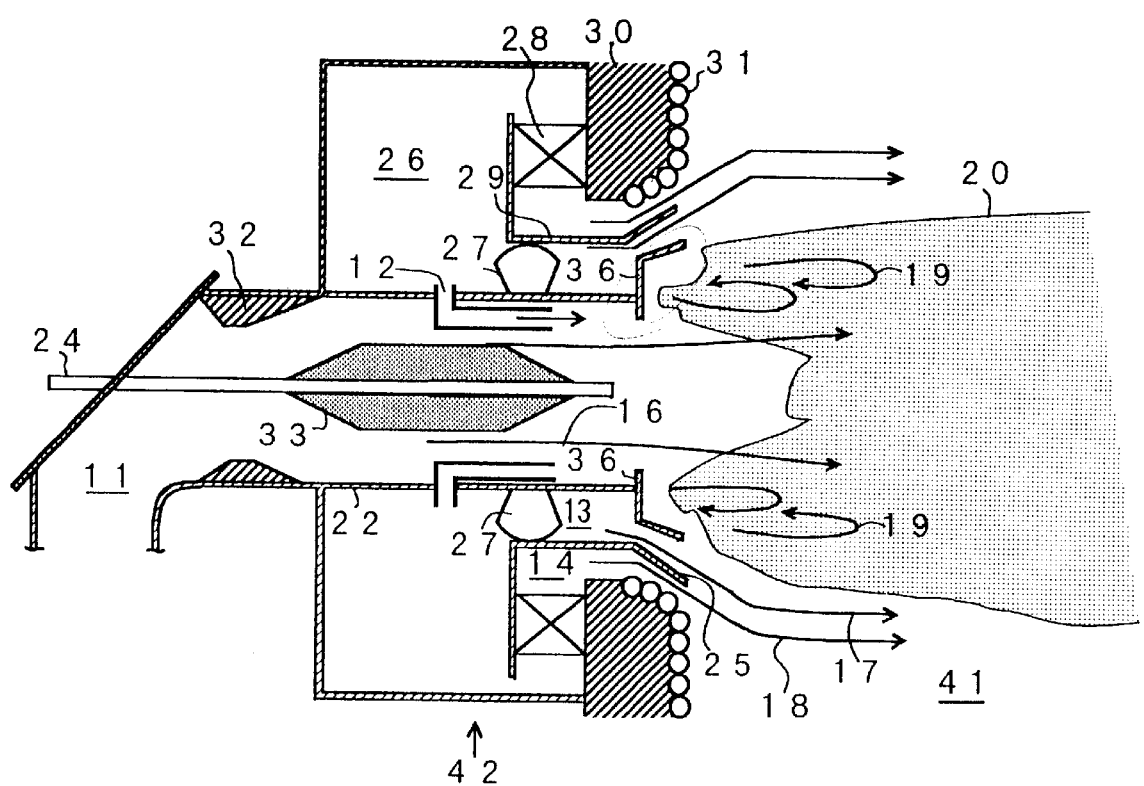
FIG. 19 is a cross sectional view of a solid fuel burner according to a sixth embodiment of the invention.
Figure 20:
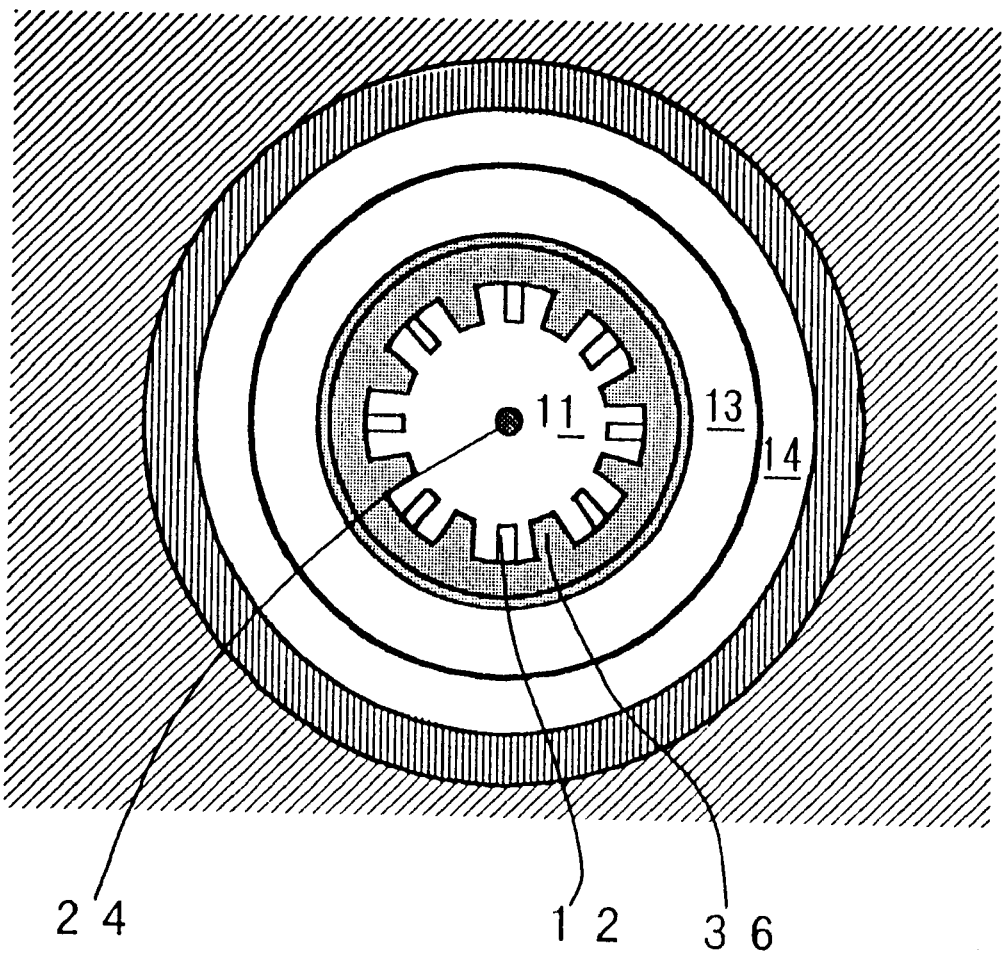
FIG. 20 is a front view of the solid fuel burner of FIG. 19, viewed from the furnace side.

FIG. 19 is a cross sectional view of a solid fuel burner 42 according to a sixth embodiment of the invention. FIG. 20 is a front view of the burner viewed from the side of the furnace 41.

Fluid mixture of fuel and exhaust gas is supplied to a furnace 41 through a fuel nozzle 11. An L-shaped from sectional view flame stabilizing ring 36 is provided at the tip of the fuel nozzle 11. A recirculation zones 19 is formed in the downstream (inside the furnace 41) of the stabilizer, whereby a flame is formed starting from the vicinity of the burner 42. The burner shown in FIG. 19 is characterized in that additional air holes (not shown) or additional air nozzles 12 (see FIG. 20) are provided so that ignition air is introduced between the shark-tooth shaped flame stabilizing ring 36. By virtue of this, ignition is easily triggered around each the shark-tooth shaped flame stabilizing ring 36 (ignition occurs downstream of the shark-tooth shaped flame stabilizing ring 36).

(Seventh Embodiment)

Figure 21:
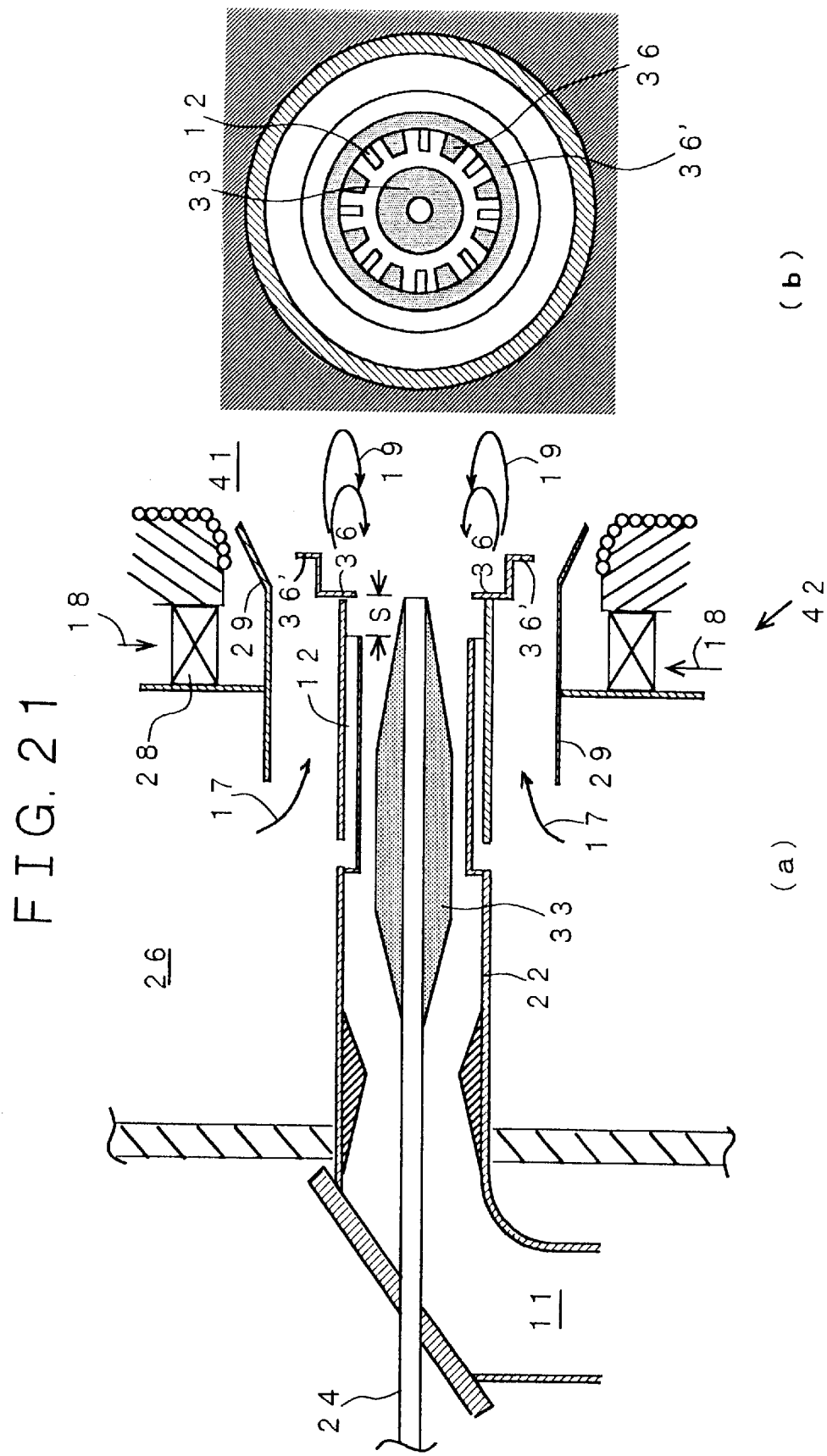
FIG. 21 is a cross sectional view (FIG. 21($a$)) and a front view (FIG. 21($b$)) of a burner according to a seventh embodiment of the invention.

A seventh embodiment of the invention is described below. FIG. 21 is a cross sectional view of a burner according to the seventh embodiment. FIG. 21(*a*) is a cross sectional view of the burner, while FIG. 21(*b*) is a front view of the burner viewed from the furnace side.

Fluid mixture 1 of pulverized-coal fuel and carrier gas (primary air) is supplied to a furnace 41 through a fuel nozzle 11. An L-shaped from sectional view flame stabilizing ring 36 is provided at the tip of the fuel nozzle 11. Recirculation zoness 19 are formed in the downstream of the stabilizer, whereby a flame is formed starting from the vicinity of the burner.

A condenser 33 is provided inside the fuel nozzle 11. The condenser 33 increases the pulverized-coal concentration near the flame stabilizing ring 36, thereby accelerating the ignition. Combustion air (secondary air flow 17 and tertiary air flow 18) is supplied around the fuel nozzle 11 from an air box 26. The tertiary air flow 18 is appropriately swirled by a swirler 28, whereby the condition is optimized for NOx-reduced combustion. Further, the tertiary air flow 18 is expanded outward by a guide plate 29, thereby causing a so-called fuel-rich condition in which air is insufficient in the center of the flame. Accordingly, the combustion is carried out suitably for the NOx-reduced combustion of pulverized coal.

The burner shown in FIG. 21 is characterized in that additional air holes (not shown) or additional air nozzles 12 for ignition are provided between the condenser 33 and the inner wall of the fuel nozzle 11. Thus, additional air for ignition is supplied to the pulverized-coal flow concentrated to the inner wall side of the fuel nozzle 11 by the condenser 33, and hence oxygen concentration is increased while the pulverized-coal concentration is maintained at a predetermined or higher concentration. This improves ignitability. An oil burner 24 used at the start-up of the burner 24 is provided on the center axis of the burner 42. A mixing region S for mixing the fluid mixture with the additional air for ignition is provided between the condenser 33 and the flame stabilizing ring 36 at the tip of the fuel nozzle 11. By virtue of this, the fluid mixture in the fuel nozzle 11 is sufficiently mixed with the ignition additional air 21. The exit of the additional air hole or additional air nozzle 12 for ignition is provided between the shark-tooth shaped flame stabilizing ring 36 (see FIG. 21(*b*)). By virtue of this, ignition is easily triggered around each the shark-tooth shaped flame stabilizing ring 36 (ignition occurs downstream of the shark-tooth shaped flame stabilizing ring 36.

A guide 36' for spreading the ejection direction of outer air may be provided at the exit of the passage of the outer air nozzle (secondary air flow 17, tertiary air flow 18, and the like), the recirculation zones 19 is formed more easily in cooperation by a guide 36' and a flame stabilizing ring 36.

(Eighth Embodiment)

Figure 22:
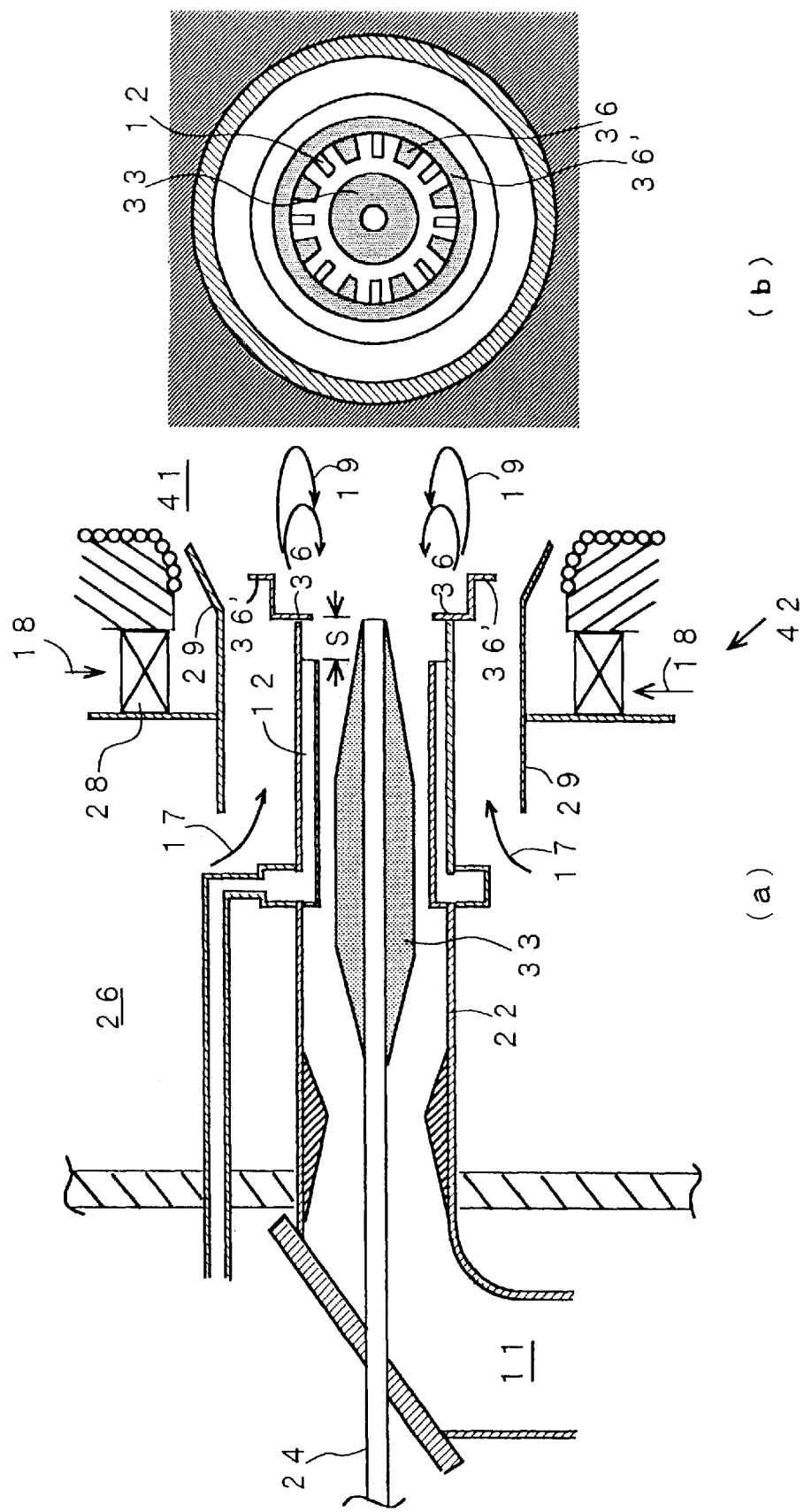
FIG. 22 is a cross sectional view (FIG.22($a$)) and a front view (FIG.22($b$)) of a burner according to an eighth embodiment of the invention.

A burner 42 according to an eighth embodiment shown in FIG. 22 (FIG. 22(a) is a cross sectional view of the burner 42, while FIG. 22(b) is a front view of the burner viewed from the furnace side) is characterized in that the ignition additional air is introduced from a supply line dedicated for additional air holes (not shown) or additional air nozzles 12 for ignition, through the additional air holes (not shown) or additional air nozzles 12 for ignition, and into the mixing region S for mixing the fluid mixture in the fuel nozzle 11 with the ignition additional air 67.

In the burner 42 shown in FIG. 22, the ignition additional air 67 introduced from the supply line 66 can have a pressure different from the air pressure obtained from the air box 26, thereby permitting free selection of the size of the additional air holes (not shown) or additional air nozzles 12. Further, an ignition air rate adjusting mechanism (not shown) can be provided in the dedicated ignition additional air line 66, thereby permitting easy control of the supply rate. When an oxygen-enriched gas is used as the ignition additional air 67 ignitability is improved.

FIG. 23 is a cross sectional plan view of a furnace 41 using the burners according to any of the above-mentioned embodiments of the invention, in the corner firing method.

In general, as for burners according to the corner firing method, a horizontal section for a burner compartment 37 is provided at each corner of the furnace 41. At a high load of the furnace 41 as shown in FIG. 23(a), the jet from each burner in the burner compartment 37 forms a blow-off section 38 at the bottom of the burner, thereby forming a stable combustion region in the furnace 41.

In an example of operation of the burner according to the corner firing method shown in FIG. 23, the velocity of the tertiary air flow 18 of the outermost tertiary air nozzle 14 contributing to the formation of the stable combustion region in the furnace is 50 m/s or higher, while the velocity of the pulverized-coal flow 16 supplied by the exhaust gas is 5–30 m/s, and the velocity of the air flow of the center air nozzle 10 for accelerating the ignition of the fuel is 5–20 m/s.

At a low load of the furnace 41 as shown in FIG. 23(b), the distribution ratio and the swirl intensity of combustion air are adjusted so that each burner forms a flame 36 of a self flame stabilizing type. FIG. 24 shows an embodiment in which the fuel is supplied into the furnace 41 from four burner compartments 37 each provided in a sidewall of the furnace 41. FIG. 25 (FIG. 25(a) at a high load, and FIG. 25(b) at a low load) shows an embodiment in which the fuel is supplied into the furnace 41 from six burner compartments 37 each provided in a sidewall of the furnace 41.

According to the above-mentioned setting, in the bottom of the burner 42, oxygen concentration is low, and there is no heat source such as a high-temperature gas circulation at a high level. Accordingly, the fuel is not ignited, whereby a blow-off section 38 is formed. In the center of the furnace 41, the fuel is mixed with jets from other burners 42 and with air from the outermost air nozzle 14, thereby forming a stable combustion region and hence a stable combustion.

The function of the outermost air nozzle 14 at a high load is to stabilize the formation of the stable combustion region similarly to the prior art case. For this purpose, the flow velocity is preferably 50 m/s or higher.

In short, in the present invention, in a furnace 41 according to the corner firing method and tangential firing method of the prior art, a blow-off section 38 is formed in the fuel jet at the bottom of the burner 42 at a high load, thereby forming a stable combustion region within the furnace 41. In contrast, at a low load, a flame is formed in the fuel jet starting from the bottom of the burner 42 by a self flame stabilizing scheme. Such an operation realizes applicability in a wide range of loads of the furnace 41.

More specifically, water-cooling wall structure of each furnace wall surface is not modified, but a part of the burner compartment 37 is modified into a burner structure comprising: a passage for fuel; and a plurality of passages for combustion air. Then, adjusted are: the distribution of combustion air; and the swirl intensity of the fuel jet and the combustion air jet. As such, the operation is controlled depending on low or high load of the furnace.

In the above-mentioned description, water-cooling wall structure is not modified, and a part of the burner compartment 37 alone is modified. However, the invention is applicable to the case of a water-cooling wall structure provided between two adjacent burners 42 in a newly constructed boiler.

Figure 27:
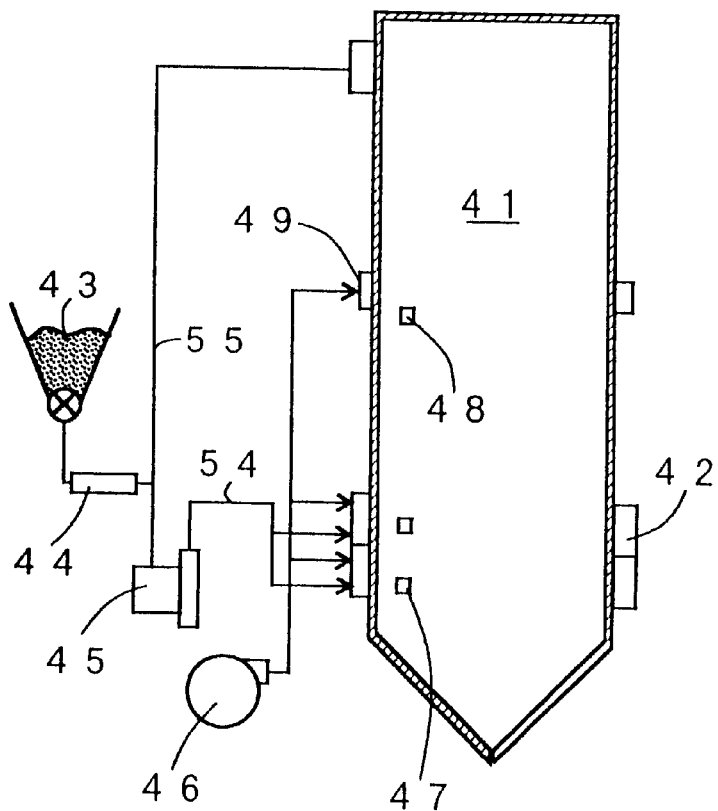
FIG. 27 is a schematic diagram of a combustion apparatus according to an embodiment of the invention.
Figure 28:
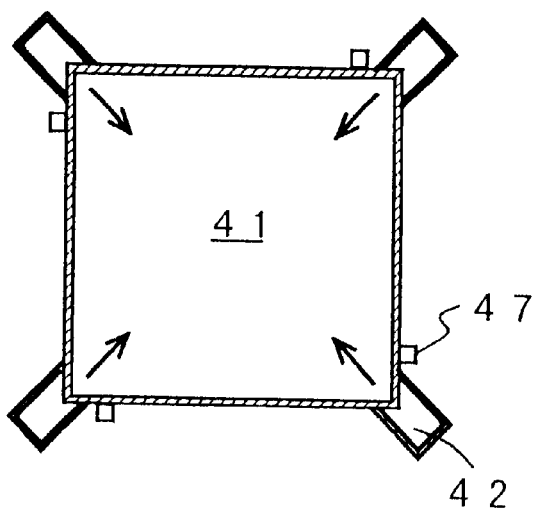
FIG. 28 is a cross sectional plan view of the combustion apparatus of FIG. 27.

FIG. 27 is a schematic diagram of a combustion apparatus using the burners for coal such as brown coal and lignite, according to the invention. FIG. 28 is a cross sectional plan view corresponding to FIG. 27. The following description is made with reference to FIG. 27 and FIG. 28.

The furnace 41 of the combustion apparatus comprises two vertical rows of burners 42 in each corner. Each burner 42 is arranged so as to horizontally direct the center of the furnace 41. Coal and the like is supplied from a fuel hopper 43, through a coal supplier 44, and into a fan mill 45. The coal pulverized by the fan mill 45 is supplied through a fuel pipe 54 into the burner 42. At that time, exhaust gas extracted from the upper part of the furnace 41 is mixed with coal in the exhaust gas duct 55 located downstream of the coal supplier 44, and then introduced into the fan mill 45. When the coal is mixed with high-temperature combustion gas, moisture in the coal evaporates. Further, since the oxygen concentration is reduced, spontaneous ignition and explosion of the coal are suppressed even when the coal is heated up during pulverization by the fan mill 45. In the case of brown coal, oxygen concentration is generally 8–15%. Air to be supplied to both the burner 42 and the after-air port 49 downstream thereof is supplied by the blower 46. Used is a two-stage combustion method in which the burner 42 supplies air of an amount less than the amount necessary for complete combustion of the fuel, and in which the after-air port 49 supplies the air deficit. However, also possible is a single-stage combustion scheme in which the after-air port 49 is not provided, and in which the burner 42 supplies all of the necessary amount of air.

In the burner 42, the method of combustion is changed depending on the load of the combustion apparatus (furnace 41). That is, at a high load, thermal load near the burner 42 is reduced by forming the flame in a position far from the burner 42. In contrast, at a low load, the flame is formed starting from the exit of the fuel nozzle 11. At that time, for a safe operation of the combustion apparatus, the flame needs to be monitored. In the invention, since the method of combustion is changed depending on the load, the method of flame monitoring is preferably changed depending on the load. That is, at a low load, since the flame is formed independently in each burner 42, a flame detector 47 needs to be provided in each burner 42. In contrast, at a high load, in order to monitor the flame which is formed in a position far from the burner 42, necessary is a flame detector 48 for monitoring the center of the furnace 41. An appropriate signal from the flame detectors 47 and 48 is selected depending on the load and the method of combustion, whereby the flame is monitored.

Further, in order to reduce slagging onto the burner structure and the furnace wall at a high load, thermometers or radiation intensity meters (neither shown) may be provided in the furnace walls or the pulverized-coal burners 42, whereby the flow rate of additional air and the flow rate of center air may be adjusted in response to the signal from such instruments.

Figure 29:
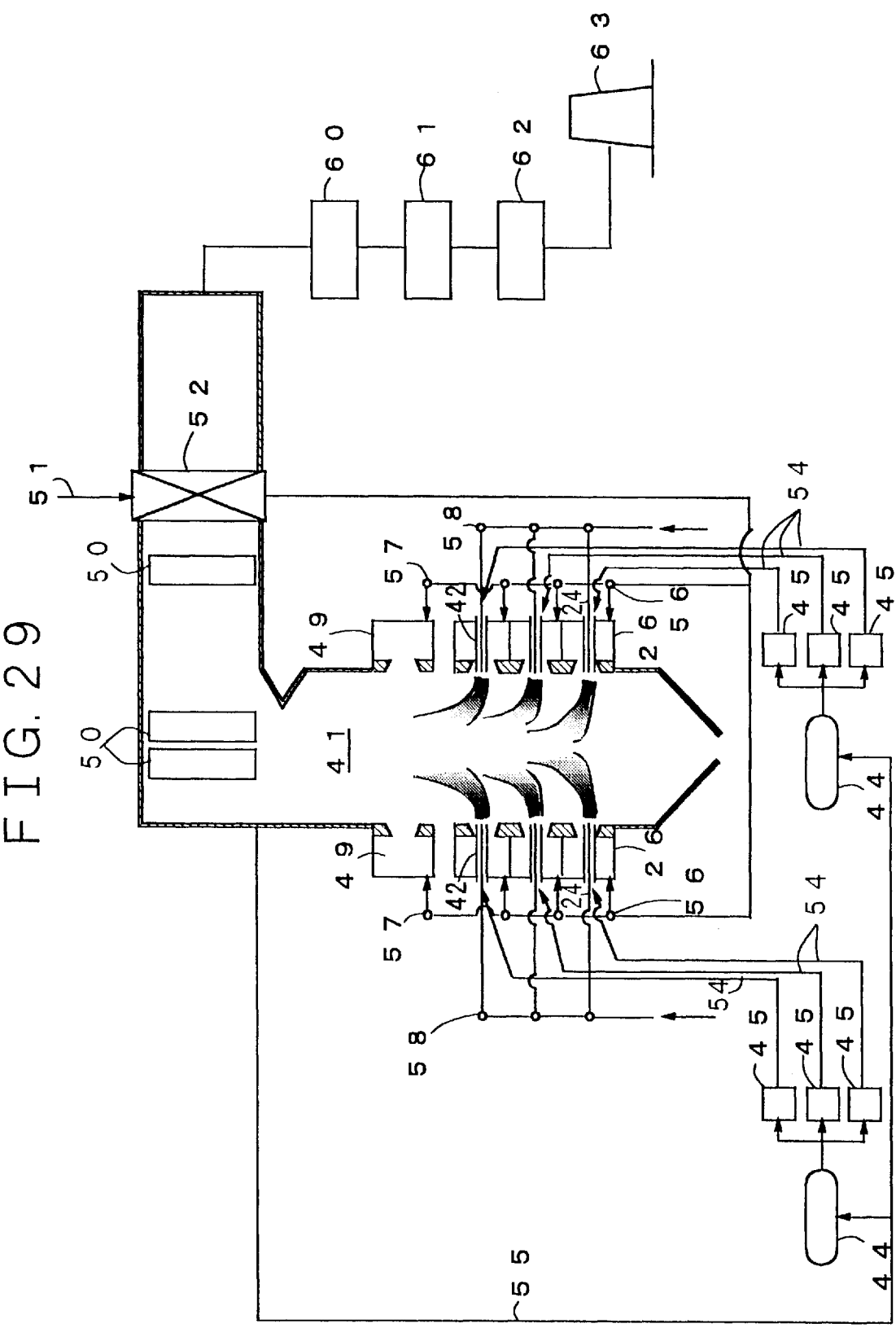
FIG. 29 is a schematic diagram of a pulverized-coal boiler system according to an embodiment of the invention.
Figure 30:
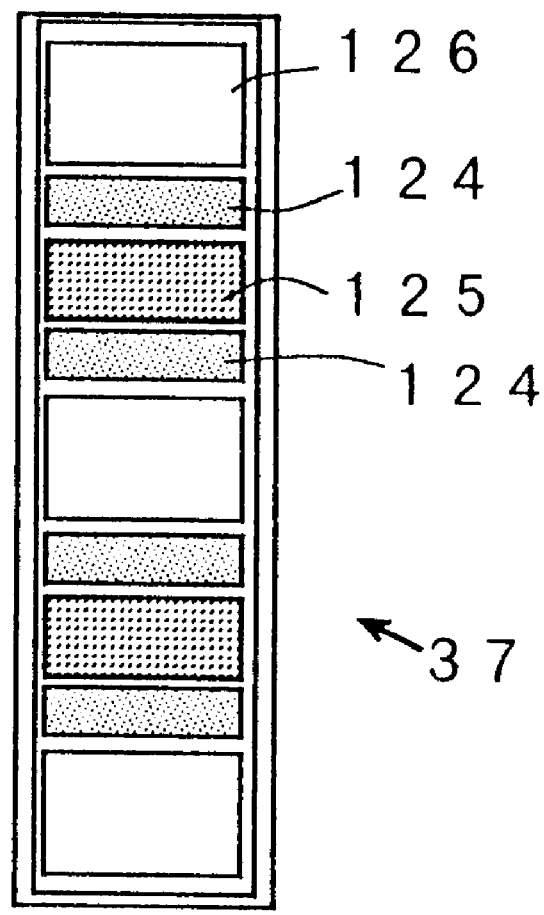
FIG. 30 is a front view of an example of a prior art burner compartment, viewed from the furnace side.
Figure 32:
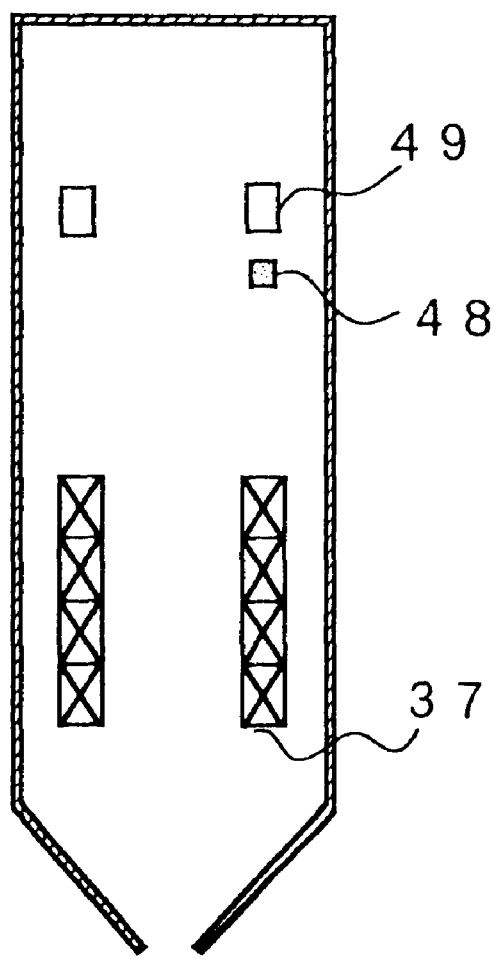
FIG. 32 is a cross sectional elevation view of a prior art furnace, showing the position of an in-furnace flame detector arranged for monitoring the center of the furnace.

FIG. 29 shows the configuration in which various burners for combusting coal, such as brown coal and lignite, according to any of the above-mentioned embodiments of the invention is applied to a pulverized-coal boiler system.

The pulverized-coal boiler of FIG. 29 has the configuration of burners 42 according to a two-stage cumbustion method, and comprises an after-air port 49. A plurality of burners 42 are arranged in three vertical rows by five horizontal rows in the furnace 41. The horizontal burner arrangement of the furnace 41 is not shown. Both the number of burners 42 and the arrangement thereof are determined by both the capacity (maximum combustion rate for pulverized coal, boiler capacity, and the like) of a single burner and the boiler structure.

The burners 42 of each stage are placed in an air box 26. An atomizer for ejecting the combustion-assisting oil with the carrier gas of air is provided in the burner 42. The combustion-assisting oil is supplied through a distributor 58 into an oil nozzle 24 of each burner 42. Combustion air 51 is heated up by a heat exchanger 52, thereby becoming hot air at approximately 300° C. The combustion air is introduced into an air box 26 after adjustment of the flow rate by a damper 56. The combustion air is then ejected through each burner 42 into the furnace 41. Combustion air 51 is further supplied through a damper 57 to the after-air port 49.

Exhaust gas is extracted through an exhaust gas duct 55 connected to the vicinity of the exhaust gas exit in the furnace exit, thereby being supplied to a coal supplier 44. Pulverized coal is supplied to a fan mill 45 together with the carrier exhaust gas, and pulverized here. Then, the grain size distribution is adjusted, and after that, the pulverized coal is supplied to the burner 42. Both the grain size of the pulverized coal supplied to the burner 42 and the distribution thereof are adjusted depending on the boiler load. The wall surface of the furnace 41 generally has a water-cooling structure for generating primary steam. The primary steam is superheated by a superheater 50, thereby becoming a superheated steam and being supplied to a steam turbine not shown. The steam turbine is linked to a power generator, and hence the power generator generates electricity.

In a flue for releasing the exhaust gas of the pulverized-coal boiler through a smokestack 63 into the air, provided is an exhaust gas cleaning apparatus comprising a NOx removal apparatus 60, an electric dust collector 61, and an SOx removal apparatus 62.

The amount of combustion air supplied to each burner 42 is set to be 89–90% (volume) of the theoretical amount of air for coal. The amount of after-air from the after-air port 49 is set to be approximately 40–30% (volume) of the theoretical amount of air for coal. Accordingly, the total amount of air is approximately 120% (volume) of the theoretical amount of air for coal. Combustion in the flame of the pulverized-coal burner 42 is carried out with air of an amount less than the theoretical amount of air, and after that, unburnt carbon of the fuel is reduced by the after-air combustion.

Coal-fired power generation using low-coalification coal such as brown coal and lignite is realized by a coal-fired power generation system comprising: a furnace having furnace walls surfaces equipped with a plurality of burners 42 according to the invention; a coal-fired boiler for boiling water to generate steam by using combustion heat obtained by the combustion of pulverized coal by the burners 42; steam turbines driven by the steam obtained by the boiler; and a power generator (not shown) driven by the steam turbines.

Industrial Applicability

The invention provides: a solid fuel burner and a method of combustion using the same which can perform stable combustion in a wide range of furnace loads from a high-load operation condition to a low-load operation condition even in the case of combusting a rather-poor-combustibility solid fuel like low-coalification coal such as brown coal and lignite; a combustion apparatus, such as a furnace, a heating furnace, and a hot blast stove, using said burner, and a method of operation thereof; a coal-fired boiler and a system using the same; and a coal-fired power generation system.

The invention permits ignition from the vicinity of the burner even when a low-oxygen-concentration gas is used as the carrier gas. Accordingly, even pulverized coal such as brown coal having poor ash characteristics can be rapidly and efficiently combusted near the burner exit. This permits NOx reduction in the exhaust gas and prevents ash cohesion around the burner.

What is claimed is:

1. A solid fuel burner comprising:

a center air nozzle for ejecting air;

a fuel nozzle provided outside said center air nozzle and ejecting a fluid mixture consisting of a solid fuel and a carrier gas;

additional air holes or additional air nozzles provided on and completely surrounded by an inner wall surface of said fuel nozzle and ejecting air, wherein the additional air holes or additional air nozzles are positioned such that the air ejecting exits parallel along the inner wall surface of the fuel nozzle, and wherein an oxygen concentration of the air ejecting parallel and near the inner wall surface of the fuel nozzle is adjustable to stabilize a flame at a desired load;

one or more outer air nozzles provided outside said fuel nozzle and ejecting combustion air; and a plurality of flame stabilizing rings for serving as an obstacle against both the flow of gas from said fuel nozzle and air ejected from said air nozzles provided at a tip of the wall surface between the fuel nozzle and the outer air nozzle;

wherein the burner has an upstream side.

2. A solid fuel burner according to claim 1, wherein a nozzle exit of any one or both of said center air nozzle and said additional air holes or additional air nozzles are located on an upstream side of the fuel nozzle.

3. A solid fuel burner according to claim 1, wherein heated and/or pressurized air is supplied to said additional air holes or additional air nozzles.

4. A solid fuel burner according to claim 1, wherein a condenser consisting of a conical section having a gradually increasing cross section and a conical section having a gradually decreasing cross section starting from the upstream side is provided on an outer wall surface of said center air nozzle.

5. A solid fuel burner according to claim 1, wherein a passage contracting member for temporarily contracting the cross section of the passage of said fuel nozzle starting from the upstream side and for expanding said cross section to the original value is provided on an inner wall of said fuel nozzle.

6. A solid fuel burner according to claim 1, wherein a swirler is provided within said center air nozzle.

7. A solid fuel burner according to claim 1, wherein a swirler is provided within said outer air nozzle.

8. A solid fuel burner according to claim 1, wherein a guide for defining the direction of the outer air ejection is provided in an exit of said outer air nozzle.

9. A solid fuel burner according to claim 1, wherein a guide for causing the outer air from said outer air nozzle to be ejected at a tilt angle of 45 degrees or less relative to a burner center axis is provided in an exit of said outer air nozzle.

10. A solid fuel burner according to claim 1, wherein a flame stabilizing ring having shark-tooth shaped protrusions directed inward toward the exit of said fuel nozzle is provided.

11. A solid fuel burner according to claim 1, wherein the cross section of the downstream passage of said center air nozzle is smaller than the cross section of the upstream passage of said center air nozzle.

12. A solid fuel burner according to claim 11, wherein the location of said swirler within said center air nozzle is movable in the direction of the burner center axis within said center air nozzle.

13. A solid fuel burner according to claim 1, wherein a swirler for adjusting the swirl intensity of air flow depending on the combustion load is provided within said center air nozzle.

14. A method of combustion using a solid fuel burner according to claim 1, using a swirler the air ejection mode of which is selectable, depending on the combustion load, from the group consisting of: an air ejection mode in which the air flow from said center air nozzle is ejected as a straightforward jet or a weakly swirled jet; and an air ejection mode in which the air flow from said center air nozzle is ejected as a strongly swirled jet.

15. A method of combustion using a solid fuel burner according to claim 1, wherein at a low combustion load, a strongly swirled jet is ejected from said center air nozzle, whereas at a high combustion load, a straightforward jet or weakly swirled jet is ejected from said center air nozzle.

16. A method of combustion using a solid fuel burner according to claim 1, wherein the ratio between the amount of air ejected from said center air nozzle and the amount of air ejected from said additional air holes or additional air nozzles is adjusted depending on the combustion load.

17. A method of combustion using a solid fuel burner according to claim 1, wherein at a low combustion load, the amount of air ejected from said center air nozzle is reduced, and at the same time, the contribution of the amount of air ejected from said additional air holes or additional air nozzles is increased; whereas at a high combustion load, the amount of air ejected from said center air nozzle is increased, and at the same time, the contribution of the amount of air ejected from said additional air holes or additional air nozzles is reduced.

18. A method of combustion using a solid fuel burner according to claim 1, wherein the combustion is carried out by adjusting the amount of air so that the ratio of the total amount of air supplied by said fuel nozzle, said center air nozzle, and said additional air holes or additional air nozzles, to the amount of air necessary for the complete combustion of the volatile matter by the fuel is maintained at 0.85–0.95.

19. A combustion apparatus, using exhaust gas as the carrier gas for the solid fuel used in a solid fuel burner according to claim 1, and comprising a furnace having a furnace wall surface equipped with a plurality of said solid fuel burners.

20. A combustion apparatus according to claim 19, wherein a unit is formed by solid fuel burners according to claim 1, and wherein a plurality of said units are arranged at the corners or in opposing sidewall surfaces of the furnace so as to form a pair or pairs of units.

21. A combustion apparatus according to claim 19, wherein the center air nozzle of a solid fuel burner has a cylindrical shape, wherein a pair of air pipes for supplying air are connected to a part in the upstream of said center air nozzle, and wherein said pair of air pipes are connected so that air is introduced in the tangential direction at each of opposing positions an the cross sectional circle of said center air nozzle.

22. A method for operation of a combustion apparatus according to claim 19, wherein at a high combustion load of said combustion apparatus, the amount of air ejected from said center air nozzle is increased, and at the same time, the contribution of the amount of air ejected from said additional air holes or additional air nozzles is reduced, whereby a flame of the solid fuel is formed starting from a position far from said solid fuel burner;

whereas at a low combustion load of said combustion apparatus, the amount of air ejected from said center air nozzle is reduced, and at the same time, the contribution of the amount of air ejected from said additional air holes or additional air nozzles is increased, whereby a flame of the solid fuel is formed starting immediately downstream of the fuel nozzle exit of said solid fuel burner.

23. A method of operation for a combustion apparatus according to claim 19, wherein thermometers or radiation intensity meters are provided in said solid fuel burner or on the furnace wall surface of near said solid fuel burner, whereby the amount and the swirl intensity of air ejected from said center air nozzle of said solid fuel burner or, alternatively, the amount of air ejected from said additional air holes or additional air nozzles is adjusted in response to the signal from these instruments.

24. A method of operation for a combustion apparatus according to claim 19, wherein at a high load of said combustion apparatus, combustion is carried out at a position departing from the fuel nozzle exit by 0.5 m or more on the fuel nozzle center axis within the furnace;

whereas at a low load for said combustion apparatus, the flame of solid fuel is formed starting near the furnace wall surface outside the fuel nozzle exit within the furnace.

25. A method of operation for a combustion apparatus according to claim 19, wherein at a high load of said combustion apparatus, the flame is monitored in the center of the furnace where the flame of solid fuel burners merges, by using flame detectors or by visual inspections; whereas at a low load of said combustion apparatus, the individual flame formed near the exit of each solid fuel burner is monitored.

26. A method of operation for a combustion apparatus according to claim 21, wherein at a high load of said combustion apparatus, each air tube supplies an identical amount of air into said center air nozzle; whereas at a low load of said combustion apparatus, each air tube supplies a diverse amount of air into said center air nozzle; whereby the swirl intensity of the center air flow is adjusted depending on a high or low load.

27. A coal-fired boiler comprising: a furnace having a wall surface equipped with a plurality of solid fuel burners according to claim 1; and a heat exchanger provided within said furnace and for boiling the water to generate steam by using the flame obtained by the combustion of solid fuel within said furnace.

28. A coal-fired boiler system comprising: a coal-fired boiler according to claim 27, a flue for serving as a passage for the exhaust gas from said boiler; an exhaust-gas cleaning apparatus provided in said flue; a pulverized-coal carrying apparatus for carrying the coal in the form of pulverized coal to the burners in said boiler; a pulverized-coal supply adjustment apparatus for adjusting the amount of pulverized coal supplied from said pulverized-coal carrying apparatus to said burners; and air supply adjustment apparatuses for adjusting the amount of air ejected from said burners.

29. A coal-fired power generation system comprising: a furnace having furnace wall surfaces equipped with a plurality of solid fuel burners according to claim 1; a boiler for boiling the water to generate steam by using the combustion heat obtained by the combustion of solid fuel by said burners; a steam turbine driven by the steam obtained by said boiler; and a power generator driven by said steam turbine.

30. A solid fuel burner comprising:
   a fuel nozzle for ejecting a fluid mixture consisting of a solid fuel and a carrier gas;
   additional air holes or additional air nozzles provided on and completely surrounded by an inner wall surface of said fuel nozzle and ejecting air wherein the additional air holes or additional air nozzles are positioned such that the air ejecting exits parallel along the inner wall surface of the fuel nozzle, and wherein an oxygen concentration of the air ejecting parallel and near the inner wall surface of the fuel nozzle is adjustable to stabilize a flame at a desired load;
   one or more outer air nozzles provided outside the wall surface of said fuel nozzle and ejecting air; and
   a plurality of flame stabilizing rings for acting against both the flow of gas from said fuel nozzle and air ejected from said air nozzles provided at the tip of the wall surface between the fuel nozzle and the outer air nozzle;
wherein the burner has an upstream side and a downstream side.

31. A solid fuel burner according to claim 30, wherein heated and/or pressurized air is supplied to said additional air holes or additional air nozzles.

32. A solid fuel burner according to claim 30, wherein the nozzle exits of said additional air holes or additional air nozzles are located on an upstream side of the nozzle exit of said fuel nozzle.

33. A solid fuel burner according to claim 30, wherein a condenser consisting of a section having a gradually increasing cross section and a section having a gradually decreasing cross section in the direction from the upstream side to the downstream side is provided inside the fuel nozzle.

34. A solid fuel burner according to claim 30, wherein a passage contracting member for temporarily contracting the cross section of the passage of said fuel nozzle in the direction from the upstream side to the downstream side and for expanding said cross section to the original value is provided on the inner wall surface of said fuel nozzle.

35. A solid fuel burner according to claim 30, wherein a swirler is provided inside said outer air nozzle.

36. A solid fuel burner according to claim 30, wherein a guide for defining the direction of the outer air flow ejected from said outer air nozzle is provided at an exit of said outer air nozzle.

37. A solid fuel burner according to claim 31, wherein said flame stabilizing ring has shark-tooth shaped protrusions directed inward toward the tip wall surface of said fuel nozzle is provided.

38. A solid fuel burner according to claim 30, wherein exhaust gas is used as the carrier gas for the solid fuel, and wherein the exit of said additional air holes or additional air nozzles is located between said conical section of a condenser having a gradually decreasing cross section and said flame stabilizing ring.

39. A solid fuel burner according to claim 30, wherein an air supplying section for said additional air holes or additional air nozzles is connected to air boxes for supplying combustion air to said outer air nozzle.

40. A solid fuel burner according to claim 30, wherein an air supplying section for said additional air holes or additional air nozzles is connected to a combustion gas supplying apparatus dedicated to the purpose of supplying the combustion air to said air supplying section.

41. A solid fuel burner according to claim 40, wherein said combustion air supplying apparatus is connected to a means for supplying oxygen-enriched gas or pure oxygen.

42. A solid fuel burner according to claim 40, wherein a combustion gas flow rate adjustment apparatus is provided in said combustion air supplying apparatus.

43. A method of combustion using a solid fuel burner according to claim 30, wherein at a low combustion load, the amount of air supplied from said additional air holes or additional air nozzles is increased, and at the same time, the amount of air supplied from the outermost air nozzle which is nearest to said fuel nozzle among said outer air nozzles is reduced or, alternatively the swirl intensity thereof is increased;
   whereas at a high combustion load, the amount of air supplied from said additional air holes or additional air nozzles is reduced, and at the same time, the amount of air supplied from the outermost air nozzle which is nearest to said fuel nozzle among said outer air nozzles is increased or, alternatively, the swirl intensity thereof is reduced.

44. A combustion apparatus comprising a furnace having a wall surface equipped with a plurality of solid fuel burners according to claim 30.

45. A combustion apparatus, comprising afurnace in which a unit is formed by solid fuel burners according to claim 30 and in which a plurality of said units are arranged at the corners or in opposing sidewall surfaces of the furnace so as to form a pair or pairs of units.

46. A coal-fired boiler comprising: a furnace having a wall surface equipped with a plurality of solid fuel burners according to claim 30, and heat exchangers provided within said furnace and for boiling water to generate steam by using the combustion heat obtained by combustion of solid fuel within said furnace.

47. A method of combustion using a solid fuel burner according to claim 30, wherein at a low combustion load, the amount of air supplied from said additional air holes or additional air nozzles is increased; whereas at a high combustion load, the amount of air supplied from said additional air holes or additional air nozzles is reduced.

48. A method of operation for a combustion apparatus according to claim 46,
   wherein at a high combustion load of said combustion apparatus, a flame of solid fuel is formed starting from a position far from said solid fuel burner;
   whereas at a low combustion load of said combustion apparatus, a flame of solid fuel is formed starting near the furnace wall surface immediately downstream of the fuel nozzle exit of said solid fuel burner.

49. A method of operation for a combustion apparatus according to claim 48, wherein thermometers or radiation intensity meters are provided in said solid fuel burners or on the furnace wall surface of near said solid fuel burners, whereby the amount of air ejected from said additional air holes or additional air nozzles provided in said solid fuel burners are adjusted in response to the signal from these instruments.

50. A method of operation for a combustion apparatus according to claim 48, wherein at a high load of said combustion apparatus, combustion is carried out at a position departing from the fuel nozzle exit by 0.5 m or more on the fuel nozzle center axis within the furnace;
   whereas at a low load of said combustion apparatus, the flame of solid fuel is combusted starting near the furnace wall surfaces outside the fuel nozzle exit within the furnace.

51. A method of operation for a combustion apparatus according to claim 48, wherein at a high combustion load of said combustion apparatus, the flame is monitored in the center of the furnace where the flame of solid fuel burners merges, by using flame detectors or by visual inspections; whereas at a low combustion load of said combustion apparatus, the individual flame formed near the fuel nozzle exit of each solid fuel burner within said furnace is monitored.

52. A method of operation for a combustion apparatus according to claim 48, wherein at a low combustion load of said combustion apparatus, the amount of air is adjusted so that the ratio of the total amount of air supplied by said solid fuel burner, to the amount of air necessary for the complete combustion of the volatile matter in the fuel is maintained at 0.85–0.95.

53. A coal-fired power generation system comprising: a furnace having furnace wall surfaces equipped with a plurality of solid fuel burners according to claim 30; a boiler for boiling the water to generate steam by using combustion heat obtained by the combustion of solid fuel by said burners; a steam turbine driven by the steam obtained by said boiler; and a power generator driven by said steam turbine.

* * * * *